United States Patent [19]
Crowley

[11] Patent Number: 5,914,805
[45] Date of Patent: Jun. 22, 1999

[54] GYRICON DISPLAY WITH INTERSTITIALLY PACKED PARTICLES

[75] Inventor: Joseph M. Crowley, Morgan Hill, Calif.

[73] Assignee: Xerox Corporation, Stamford, Conn.

[21] Appl. No.: 08/716,675

[22] Filed: Sep. 13, 1996

Related U.S. Application Data

[XX .
[60] Provisional application No. 60/020,522, Jun. 27, 1996.

[51] Int. Cl.$^6$ ................................................. G02B 26/00
[52] U.S. Cl. .......................................... 359/296; 345/107
[58] Field of Search ................................. 428/323, 331, 428/327, 402, 407, 375, 688; 156/63; 359/296, 298; 345/107, 108; 349/117, 188; 427/212, 214; 364/4, 8, 15, 7

[56] References Cited

U.S. PATENT DOCUMENTS

| | | | |
|---|---|---|---|
| Re. 29,742 | 8/1978 | Tung ........................................... | 2/412 |
| 2,326,634 | 8/1943 | Gebhard et al. ........................ | 359/540 |
| 2,354,018 | 7/1944 | Heltzer et al. ............................. | 88/82 |
| 2,354,048 | 7/1944 | Palmquist ................................. | 40/135 |
| 2,354,049 | 7/1944 | Palmquist ................................. | 40/135 |
| 2,407,680 | 9/1946 | Palmquist et al. ........................ | 88/82 |
| 2,600,963 | 6/1952 | Bland ......................................... | 49/58 |
| 2,684,788 | 7/1954 | Bland ......................................... | 222/177 |
| 2,794,301 | 6/1957 | Law et al. ................................... | 49/84 |
| 2,950,985 | 8/1960 | d'Adrian .................................... | 117/33 |
| 2,965,921 | 12/1960 | Bland ......................................... | 18/2.5 |
| 2,980,547 | 4/1961 | D'Adrian .................................. | 106/47 |
| 3,150,947 | 9/1964 | Bland ......................................... | 65/21 |
| 3,222,204 | 12/1965 | Weber et al. ............................. | 117/17 |
| 3,243,273 | 3/1966 | Bland ......................................... | 65/21 |
| 3,310,391 | 3/1967 | Law ........................................... | 65/21 |
| 3,617,333 | 11/1971 | Brown ................................... | 117/35 R |
| 3,648,281 | 3/1972 | Dahms et al. ........................... | 340/373 |
| 3,795,435 | 3/1974 | Schwab .................................... | 350/105 |
| 3,915,771 | 10/1975 | Gatzke et al. ............................. | 156/71 |
| 4,002,022 | 1/1977 | Guillermo .............................. | 58/126 R |

(List continued on next page.)

OTHER PUBLICATIONS

Lawrence L. Lee, "A Magnetic Particles Display", *IEEE Transactions on Electron Devices,* vol. ED 22, No. 9, Sep. 1975, pp. 758–765.

Richard A. Strain, "Additive Color Mixture with Fluorescent Pigments and Special Illumination", *Color Research and Applications,* vol. 1, No. 3, Fall 1976, pp. 146–147.

N. K. Sheridon and M. A. Berkovitz, "The Gyricon—A Twisting Ball Display", *Proceedings of the S. I. D,* vol. 18/3 & 4, 1977, pp. 289–293.

(List continued on next page.)

*Primary Examiner*—Loha Ben
*Attorney, Agent, or Firm*—Alexander E. Silverman

[57] ABSTRACT

A gyricon or twisting-ball display having superior reflectance characteristics comparing favorably with those of white paper is based on a material made up of two populations (e.g., two different sizes) of optically anisotropic particles, such as bichromal balls, disposed in a substrate. Particles of the first population, as considered by themselves without the particles of the second population, are disposed in the substrate in a closely packed (e.g., geometrically regular) arrangement having interstices. Particles of the second population are disposed in the interstices of the arrangement. A rotatable disposition of each particle is achievable while the particle is thus disposed in the substrate; for example, the particles can already be rotatable in the substrate, or can be rendered rotatable in the substrate by a nondestructive operation performed on the substrate. In particular, the particles can be situated in an elastomer substrate that is expanded by application of a fluid thereto so as to render the particles rotatable therein. A particle, when in its rotatable disposition, is not attached to the substrate. A reflective-mode display apparatus can be constructed from a piece of the material together with a mechanism (e.g., addressing electrodes) for facilitating rotation of at least one of the particles.

27 Claims, 18 Drawing Sheets

U.S. PATENT DOCUMENTS

| | | | |
|---|---|---|---|
| 4,082,426 | 4/1978 | Brown | 350/105 |
| 4,117,192 | 9/1978 | Jorgensen | 428/337 |
| 4,117,194 | 9/1978 | Barbe et al. | 428/374 |
| 4,126,854 | 11/1978 | Sheridon | 340/373 |
| 4,143,103 | 3/1979 | Sheridon | 264/4 |
| 4,229,732 | 10/1980 | Hartstein et al. | 340/378 |
| 4,261,653 | 4/1981 | Goodrich | 350/362 |
| 4,267,946 | 5/1981 | Thatcher | 222/345 |
| 4,288,788 | 9/1981 | Rogers et al. | 340/378 |
| 4,367,920 | 1/1983 | Tung et al. | 350/105 |
| 4,381,616 | 5/1983 | Saxer | 40/502 |
| 4,438,160 | 3/1984 | Ishikawa et al. | 427/214 |
| 4,441,791 | 4/1984 | Hornbeck | 350/360 |
| 4,492,435 | 1/1985 | Banton et al. | 350/360 |
| 4,511,210 | 4/1985 | Tung et al. | 350/105 |
| 4,569,857 | 2/1986 | Tung et al. | 427/163 |
| 4,592,628 | 6/1986 | Altman et al. | 350/486 |
| 4,678,695 | 7/1987 | Tung et al. | 428/120 |
| 4,710,732 | 12/1987 | Hornbeck | 332/7.51 |
| 4,713,295 | 12/1987 | Laroche | 428/406 |
| 4,721,649 | 1/1988 | Belisle et al. | 428/235 |
| 4,725,494 | 2/1988 | Belisle et al. | 428/325 |
| 4,919,521 | 4/1990 | Tada et al. | 359/296 |
| 4,948,232 | 8/1990 | Lange | 350/334 |
| 4,956,619 | 9/1990 | Hornbeck | 330/4.3 |
| 5,039,557 | 8/1991 | White | 427/137 |
| 5,128,203 | 7/1992 | LaRoche | 428/325 |
| 5,155,607 | 10/1992 | Inoue et al. | 359/51 |
| 5,226,099 | 7/1993 | Mignardi | 385/19 |
| 5,262,098 | 11/1993 | Crowley et al. | 264/8 |
| 5,315,776 | 5/1994 | Strawbridge et al. | 40/505 |
| 5,331,145 | 7/1994 | Hornbeck | 359/224 |
| 5,344,594 | 9/1994 | Sheridon | 264/4.1 |
| 5,389,945 | 2/1995 | Sheridon | 345/85 |
| 5,416,996 | 5/1995 | Clemens et al. | 40/502 |
| 5,459,602 | 10/1995 | Sampsell | 359/234 |
| 5,515,075 | 5/1996 | Nakagiri et al. | 345/111 |
| 5,526,016 | 6/1996 | Nakagiri et al. | 345/111 |
| 5,535,047 | 7/1996 | Hornbeck | 359/295 |

OTHER PUBLICATIONS

A. Chiang, D. Curry and M. Zarzycki, "A Stylus Writable Electrophoretic Display Device", *S.I.D. 79 Digest,* 1979, pp. 44–45.

M. Saitoh, T. Mori, R. Ishikawa and H. Tamura, "A Newly Developed Electrical Twisting Ball Display", *Proceedings of the SID,* vol. 23, No. 4, 1982, pp. 249–250.

R. Michelotto, H. Fukada and M. Ohtsu, "A Simple Method for the Production of a Two–Dimentional, Ordered Array of Small Latex Particles", *Langmuir,* vol. 11, No. 9, May, 1995, pp. 3333–3336.

Deane B. Judd and Günter Wyszecki, *Color in Business, Science and Industry* (2nd ed.), New York: John Wiley and Sons, Inc., 1967, pp. 387–405.

Wesley Wm. Wendlandt and Harry G. Hecht, *Reflectance Spectroscopy,* New York: Interscience Publishers, 1966, pp. 46–91, 253–275.

G. Chui, "A Page from the Future", San Jose Mercury News, Jun. 18, 1996, pp. 12E, 11E.

J. L. Bruneel and F. Micherson, "Optical Display Device Using Bistable Electrets," *American Institute of Physics,* vol. 30, No. 8, Apr. 15, 1977, pp. 382–383.

Robert L. Saxe and Robert I. Thompson, "Suspended–Particle Devices", *Information Display,* Nos. 4&5, 1996, pp. 20–23.

Lars A. Yoder, "The TI Digital Light Processing Micromirror Tech: Putting It To Work Now", *Advanced Imaging,* Jun. 1996, pp. 43–46.

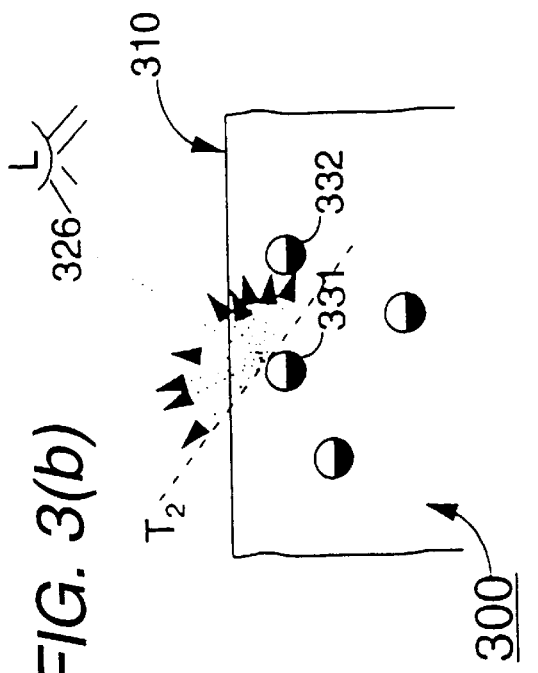
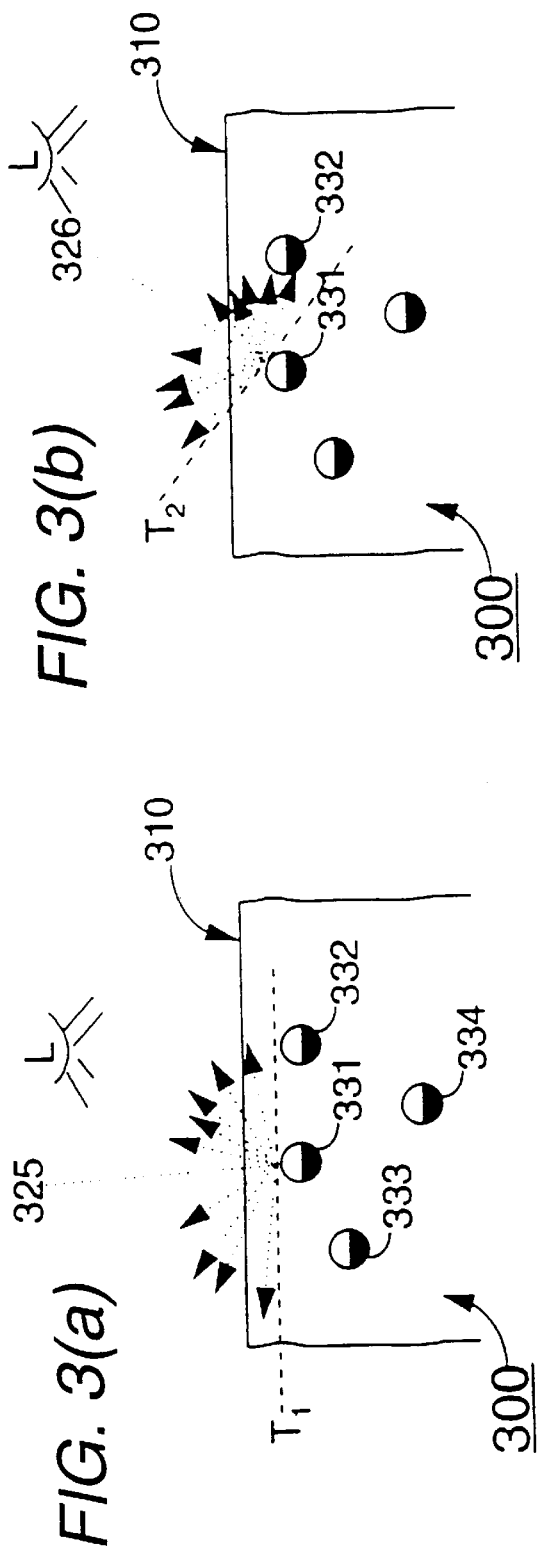

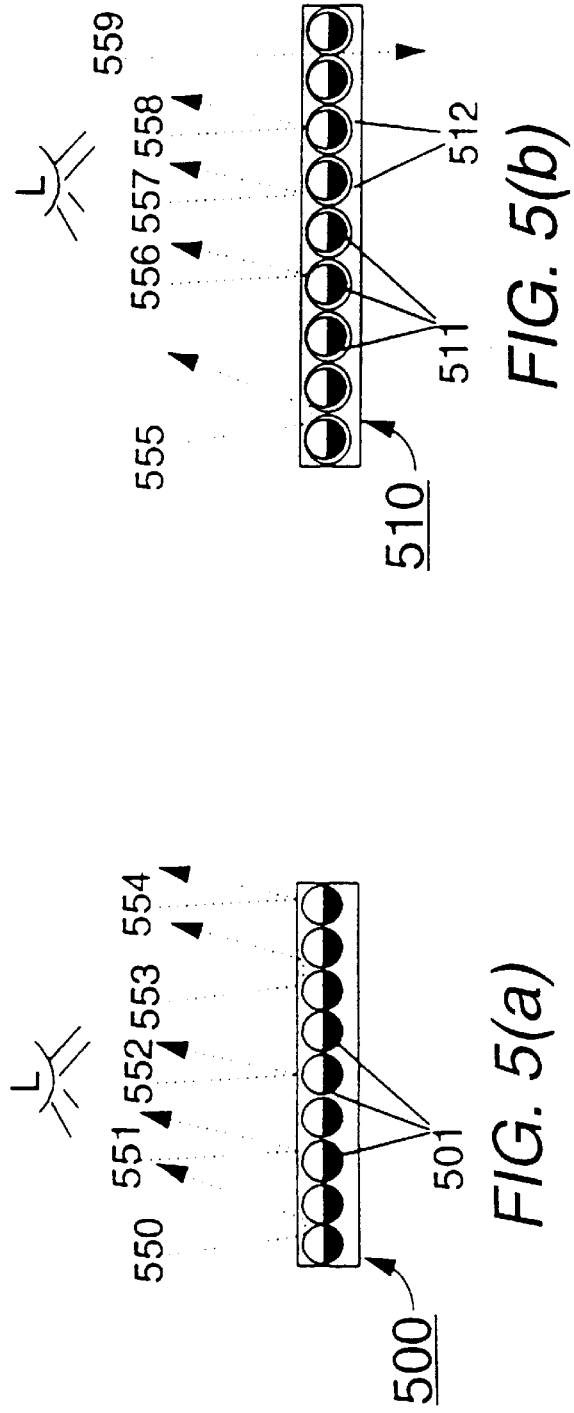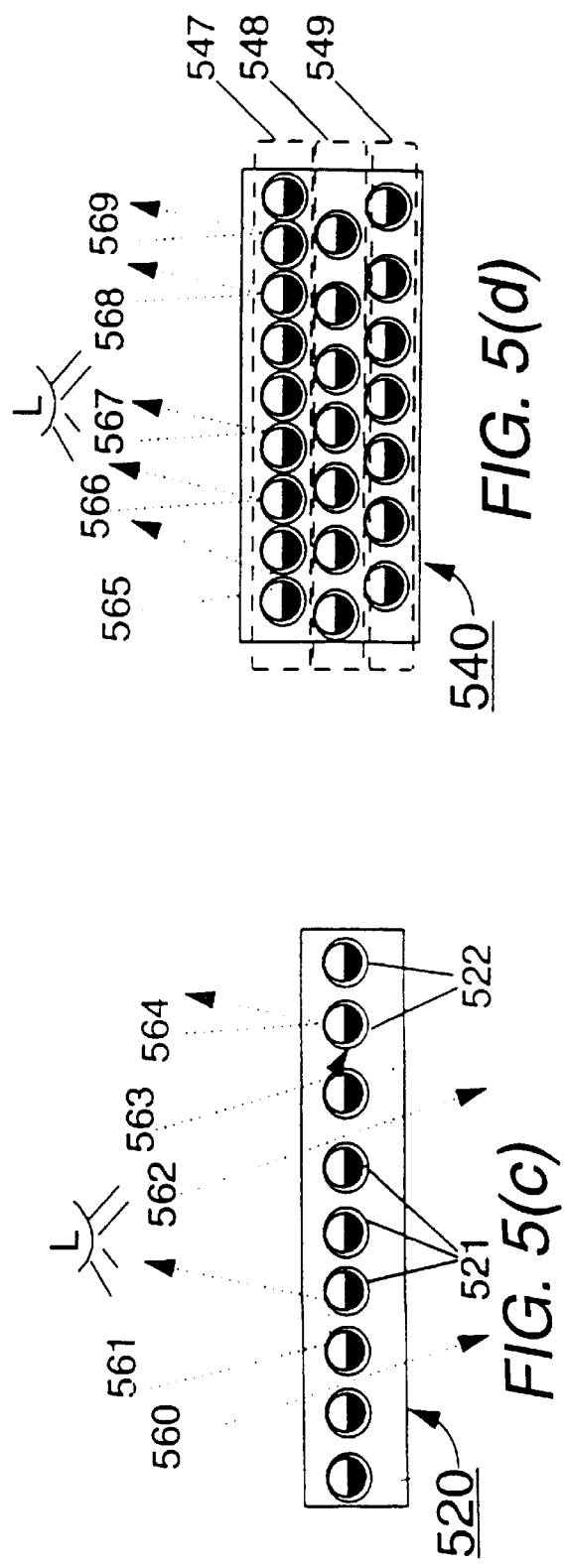

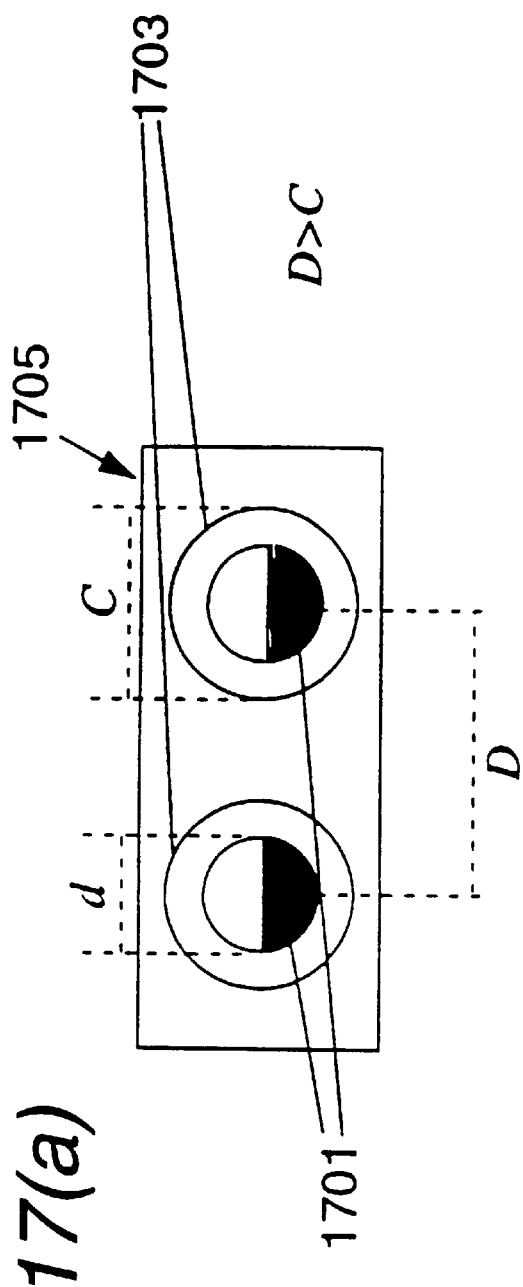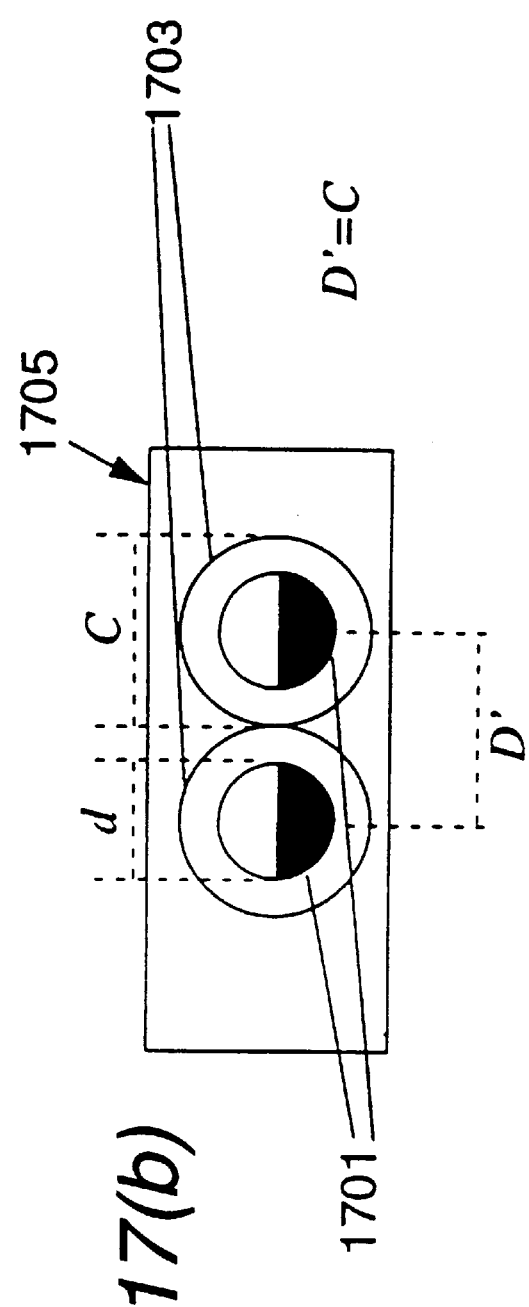

GYRICON DISPLAY WITH INTERSTITIALLY PACKED PARTICLES

PRIORITY APPLICATION

THIS APPLICATION claims priority from U.S. provisional application Ser. No. 60/020,522 filed Jun. 27, 1996 by the same inventor and assignee.

INCORPORATION BY REFERENCE

The following U.S. patents are fully incorporated herein by reference: U.S. Pat. No. 4,126,854, (Sheridon, "Twisting Ball Panel Display"); U.S. Pat. No. 4,143,103 (Sheridon, "Method of Making a Twisting Ball Panel Display"); U.S. Pat. No. 5,262,098 (Crowley et al., "Method and Apparatus for Fabricating Bichromal Balls for a Twisting Ball Display"); U.S. Pat. No. 5,344,594 (Sheridon, "Method for the Fabrication of Multicolored Balls for a Twisting Ball Display"); and U.S. Pat. No. 5,389,945 (Sheridon, "Writing System Including Paper-Like Digitally Addressed Media and Addressing Device Therefor").

RELATED PATENT APPLICATIONS

The following copending, coassigned U.S. Patent Applications are related to this case: U.S. patent application Ser. No. 08/716,672, entitled "Twisting-Cylinder Display"; U.S. patent application Ser. No. 08/713,935, entitled "Monolayer Gyricon Display"; U.S. patent application Ser. No. 08/713,936, entitled "High Reflectance Gyricon Display"; and U.S. patent application Ser. No. 08/713,325, entitled "Gyricon Display with No Elastomer Substrate."

BACKGROUND OF THE INVENTION

The invention pertains to visual displays and more particularly to electrical twisting-ball displays, such as gyricon displays and the like.

Gyricon displays, also known by other names such as electrical twisting-ball displays or rotary ball displays, were first developed over twenty years ago. See U.S. Pat. No. 4,126,854 and No. 4,143,103, incorporated by reference hereinabove.

An exemplary gyricon display 10 is shown in side view in FIG. 1 (PRIOR ART). Bichromal balls 1 are disposed in an elastomer substrate 2 that is swelled by a dielectric fluid creating cavities 3 in which the balls 1 are free to rotate. The balls 1 are electrically dipolar in the presence of the fluid and so are subject to rotation upon application of an electric field, as by matrix-addressable electrodes 4a, 4b. The electrode 4a closest to upper surface 5 is preferably transparent. An observer at I sees an image formed by the black and white pattern of the balls 1 as rotated to expose their black or white faces (hemispheres) to the upper surface 5 of substrate 2.

Gyricon displays have numerous advantages over conventional electrically addressable visual displays, such as LCD and CRT displays. In particular, they are suitable for viewing in ambient light, retain an image indefinitely in the absence of an applied electric field, and can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reuseable (and thus environmentally friendly) substitute for ordinary paper. For further advantages of the gyricon, see U.S. Pat. No. 5,389,945, incorporated by reference hereinabove.

Although gyricon displays promise to offer many of the advantages of ordinary paper together with the advantages of electrically addressable displays, the gyricon displays of the prior art have not lived up to their promise. Simply put, these displays do not look as good as paper. In particular, they do not have the high reflectance of paper (typically, 85 percent diffuse reflectance for white paper) and, consequently, do not have the high brightness and contrast characteristics of paper.

Conventional wisdom holds that the best way to improve the reflectance of a gyricon display is to make the display from a thick arrangement of bichromal balls. It is thought that the thicker the arrangement of balls, the better the reflectance and the brighter the appearance of the display. The intuitive analogy here is to ordinary paint: Other things being equal, a thicker coat of white paint reflects more incident light than a thinner coat of paint, and therefore appears brighter and whiter than the thinner coat. By analogy, it is expected that a thick arrangement of bichromal balls will tend to reflect more incident light than a thinner arrangement. In particular, the white faces of bichromal balls located at some distance below the viewing surface of the display are expected to reflect any light that is not reflected by balls located nearest the surface.

Conventional wisdom also suggests that to achieve high resolution in a gyricon display, the cavities in which the balls rotate should be packed as closely together as possible. However, it is conventionally supposed that the size of the balls within the cavities is of no consequence insofar as display reflectance is concerned. That is because in a display having a thick arrangement of bichromal balls, the balls located farther from the viewing surface of the gyricon display will "fill in the gaps" between bichromal balls located nearer the viewing surface. In other words, so long as the two-dimensional projection of the balls at all distances from the viewing surface onto the viewing surface substantially covers the viewing surface, a high-quality display will be obtained.

The series of views of FIG. 2 (PRIOR ART) illustrates several different thick arrangements of bichromal balls found in various gyricon displays of the prior art. View (a) shows first arrangement 210, which is made up of bichromal balls 211 in spherical cavities 212 arrayed so as to form multiple layers 217, 218, 219. View (b) shows second arrangement 220, which is made up of bichromal balls 221 in spherical cavities 222 arrayed in wavy layers 227, 228, 229; as can be seen, the division of second arrangement 220 into layers 227, 228, 229 is somewhat arbitrary. View (c) shows third arrangement 230, which is made up of bichromal balls 231 in spherical cavities 232 that are not layered at all, but instead are distributed randomly throughout the thickness of arrangement 230.

A thick display has certain drawbacks. Notably, a thinner display should require a lower drive voltage. Nevertheless, in keeping with the conventional wisdom, virtually all known gyricon displays are made with thick arrangements of bichromal balls (e.g., sheets of bichromal balls wherein the sheets are several ball diameters thick), because this is thought to be necessary in order to produce displays of adequate brightness. The following references are noteworthy in this regard:

application Ser. No. 08/368,133, commonly assigned with the present invention, includes a passing reference to an apparently hypothetical gyricon display containing a monolayer of bichromal balls: "Typically, for a sheet of Electric Paper containing a monolayer of bichromal balls with an average diameter of 80 microns, 50 volts will be applied to . . . orient the balls in a common direction . . . " (Specification, p. 6). However, this example appears to be posed to illustrate the calculation of appropriate drive voltages in the disclosed gyricon display, so as to show a theoretical minimum voltage needed to drive such a device. The remainder of the disclosure contemplates the usual thick ball arrangements (see, e.g., FIGS. 8 and 9 of the Ser. No. 08/368, 133 disclosure).

A paper by Lee entitled "A Magnetic-Particles Display", *IEEE Transactions on Electron Devices*, Vol. ED-22, No. 9, September 1975, pp. 758–765, concerns a magnetically activated twisting-ball display. At page 762, under the heading "Resolution, Contrast, and Gray Scale," Lee discusses the contrast provided by single and multiple layers of particles. He proposes that a random packing arrangement of bichromal balls is optimal, and predicts improved reflectance with a double layer (15 to 60 percent reflectance predicted) as opposed to a single layer (0 to 45 percent reflectance predicted).

If the conventional wisdom were correct, a display such as that disclosed by Ishikawa, Saito, Mori, and Tamura of Sony Corporation, in a U.S. Patent issued to these persons (U.S. Pat. No. 4,438,160, hereinafter the '160 patent) and assigned to Sony and further in a paper entitled "A Newly Developed Electrical Twisting Ball Display," *Prioceedings of the SID*, Vol 23/4, 1982, pp. 249–253, ought to produce good contrast and brightness. Ishikawa and his colleagues disclose a twisting-ball display having multiple layers of bichromal balls disposed in cavities whose walls touch each other (see '160 patent at col. 6, lines 8–15). They argue that by arranging the balls with a high packing density, high resolution displays can be achieved (see '160 patent at col. 7, lines 10–12).

Note that there is no discussion in the '160 patent of the relative sizes of the balls and the cavities. FIG. 6 and FIGS. 12–13 of the '160 patent are not to the contrary. In particular, the specification describing FIG. 6 and FIGS. 12–13 of the '160 patent makes no mention whatsoever of the relative diameters of balls and cavities. Moreover, the technique disclosed for forming the cavities (coating the balls with wax and later dissolving away the wax) suggests that the relative dimensions illustrated in FIG. 6 and in FIGS. 12–13 of the '160 patent are misleading, and that in practice, the cavities will be considerably larger than the balls. The '160 patent does not specify the particular method for deposition of wax on the balls (see '160 patent at col. 4, lines 60–65), but deposition of wax ("resin") by the technique disclosed at page 251 of the Saito et al. paper would produce a wax coating ranging from 5 to 15 microns in thickness, so that the cavity diameter would range from 1.2 to 1.6 times the specified 50-micron ball diameter (see '160 patent at col. 4, line 14; Saito et al. paper at p. 251).

The suggestion that the cavities in the device contemplated by the '160 patent would be substantially larger than the balls they contain is borne out by a photomicrograph of an actual device built according to the principles set forth in the '160 patent. In this photo, which is shown in FIG. 2 on page 250 of the Saito et al. paper, a thick arrangement of bichromal balls with sizeable gaps between the balls located closest to the surface can be seen. Of course, the conventional wisdom teaches that these gaps ought not to matter from the standpoint of display reflectance. The balls located farther from the viewing surface of the gyricon display should effectively "fill in the gaps" between bichromal balls located nearer the viewing surface, so that the quality of the overall display is not impaired. Put differently, it should not matter whether incident light is reflected from balls closest to the viewing surface or from balls situated a greater distance away from the viewing surface, so long as the incident light is reflected somehow.

As it turns out, the display proposed by Ishikawa and his colleagues does not have especially good reflectance properties, at least when compared with ordinary paper. Indeed, to date, known gyricon displays have offered at most about 15 to 20 percent reflectance (as measured when the white faces of all bichromal balls are turned towards the observer).

So a puzzle remains: Why do gyricon displays, even those of high resolution, lack the reflectance, brightness, and contrast qualities predicted by the conventional wisdom? How can a gyricon display be made that has superior reflectance, contrast, and brightness? Without these qualities, the promise of the gyricon display—to make electric paper a working reality instead of a laboratory curiosity—will remain unfulfilled.

SUMMARY OF THE INVENTION

The invention provides a gyricon display having superior reflectance characteristics comparing favorably with those of white paper.

The invention defies the conventional wisdom that says "a thicker display is brighter," and instead proposes a gyricon display having a tightly packed monolayer of bichromal balls. Within this layer the balls are placed, preferably in a hexagonally packed array, so that adjacent ball surfaces are as close to one another as possible. The light reflected from the inventive gyricon display is reflected substantially entirely from the monolayer of balls, so that lower layers are not needed. By eliminating the lower layers, the display can be made thinner, which in turn provides further advantages, such as lower drive voltage and better resolution due to better control of fringing fields.

In one aspect, the invention provides a material comprising a substrate and a plurality of optically anisotropic particles disposed in the substrate. The plurality of particles includes first and second populations of particles. Particles of the first population, as considered by themselves without the particles of the second population, are disposed in the substrate in a closely packed (e.g., geometrically regular) arrangement having interstices. Particles of the second population are disposed in the interstices of the arrangement. A rotatable disposition of each particle is achievable while the particle is thus disposed in the substrate; for example, the particles can already be rotatable in the substrate, or can be rendered rotatable in the substrate by a nondestructive operation performed on the substrate. In particular, the substrate can be made up of an elastomer that is expanded by application of a fluid thereto so as to render the particles rotatable therein. A particle, when in its rotatable disposition, is not attached to the substrate. A display apparatus can be constructed from a piece of the material together with means (such as an electrode assembly) for facilitating a rotation of at least one particle rotatably disposed in the substrate of the piece of material.

The invention will be better understood with reference to the following description and accompanying drawings, in which like reference numerals denote like elements.

BRIEF DESCRIPTION OF THE DRAWINGS

FIGS. 3(*a*)–3(*d*) are a series of views exemplifying light scattering pathways for each of several individual gyricon dual gyricon balls according to the light rectifier model;

FIGS. 5(a)–5(d) are a series of views contrasting exemplary light pathways in an ideal close-packed monolayer gyricon display, a high-quality close-packed monolayer gyricon display, a non-close-packed monolayer gyricon display, and a non-monolayer gyricon display with a close-packed top layer;

FIG. 16 illustrates an example of the areal coverage fraction a;

FIGS. 17(a)–17(b) are a series of views showing the relationships among center-to-center spacing, ball diameter, and cavity size;

DETAILED DESCRIPTION

Bichromal balls have a light side and a dark side. The research leading to the present invention can be thought of (with apologies to George Lucas) as an exploration of the dark side. This research shows why the conventional wisdom that "thicker is brighter" fails, and offers in its place a new, more effective model of light propagation in a gyricon display, called the light rectifier model. The new model, in turn, motivates the proposed close-packed monolayer gyricon display according to the invention.

For clarity of exposition, the discussion of the light rectifier model that follows focuses on the model proper and, except as otherwise noted (e.g., in the parameter K of the reflectance equations (1) through (3) below), neglects other optical effects not directly pertinent to the model, such as light refraction at boundaries between substances having different refractive indices.

Light Rectifier Model

Figure 1:
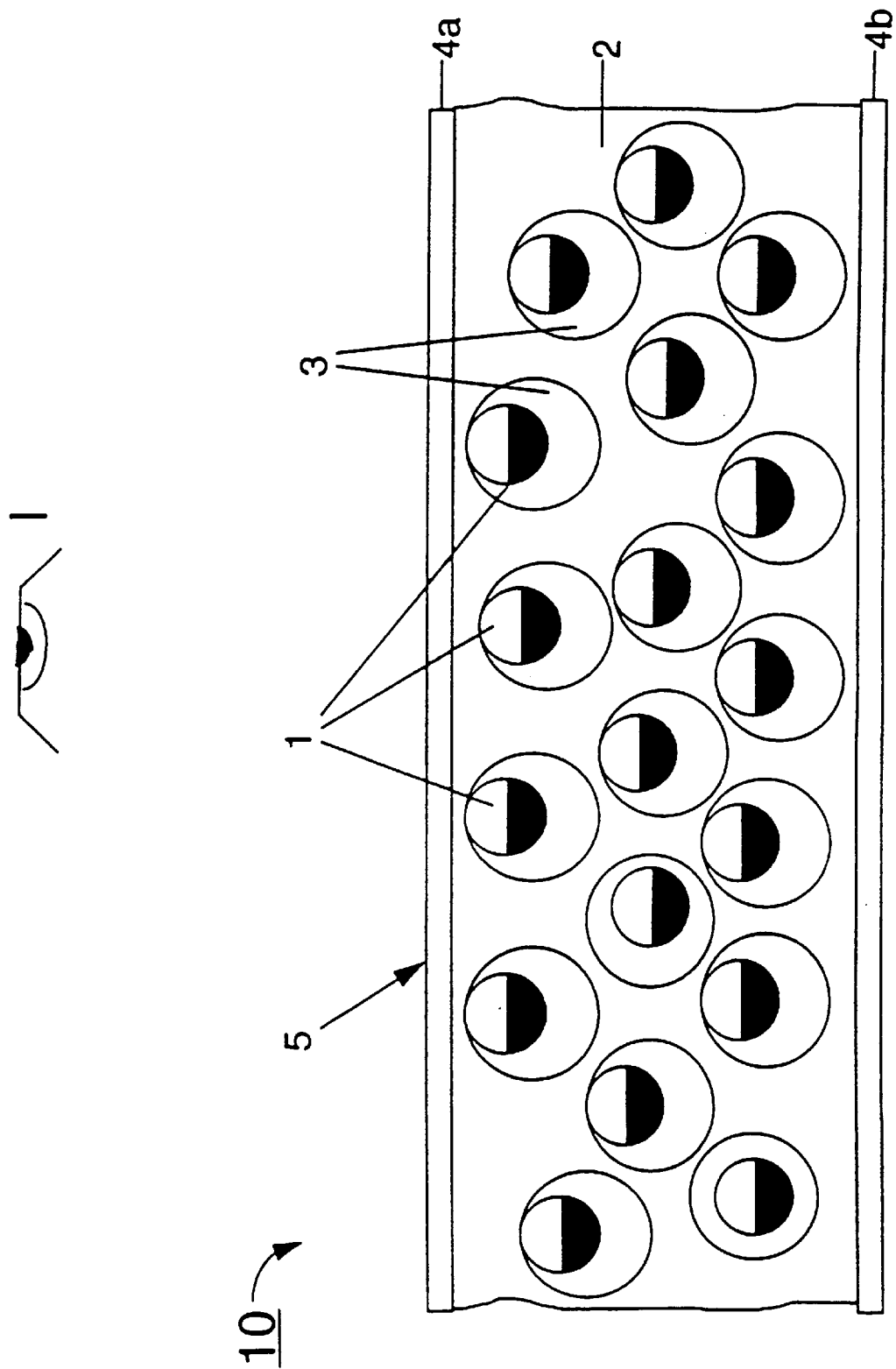
FIG. 1 is an exemplary gyricon display of the PRIOR ART.
Figure 2A:
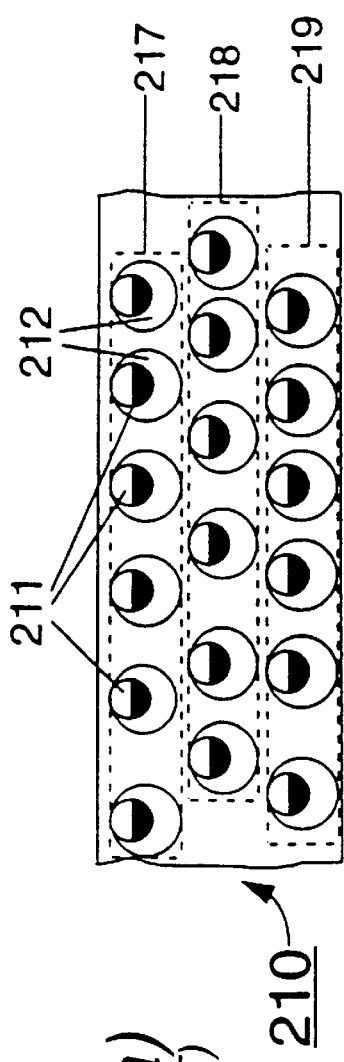
FIGS. 2(*a*)–2(*c*) are a series of views showing perfectly layered, imperfectly layered, and nonlayered (random) ball arrangements in gyricon displays of the PRIOR ART.
Figure 2B:
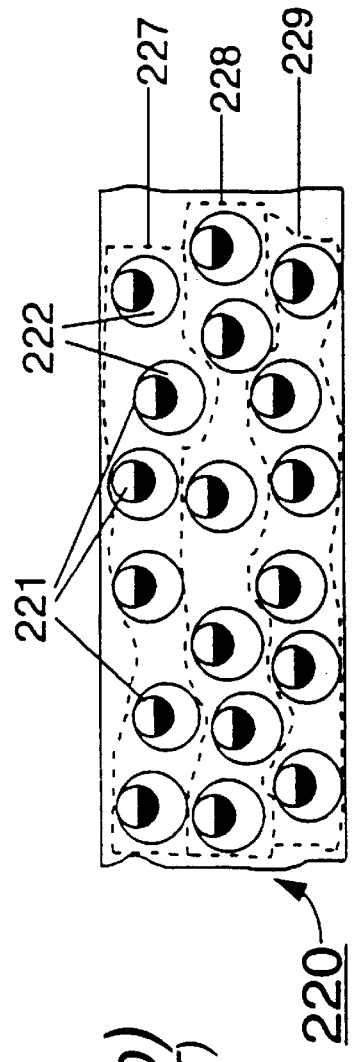
Figure 2C:
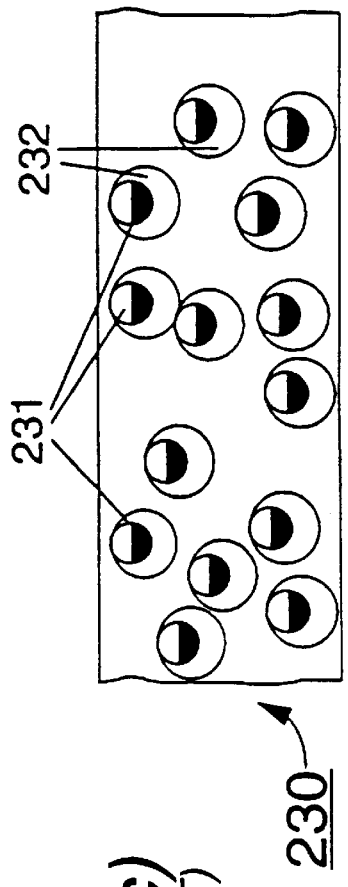
Figure 4A:
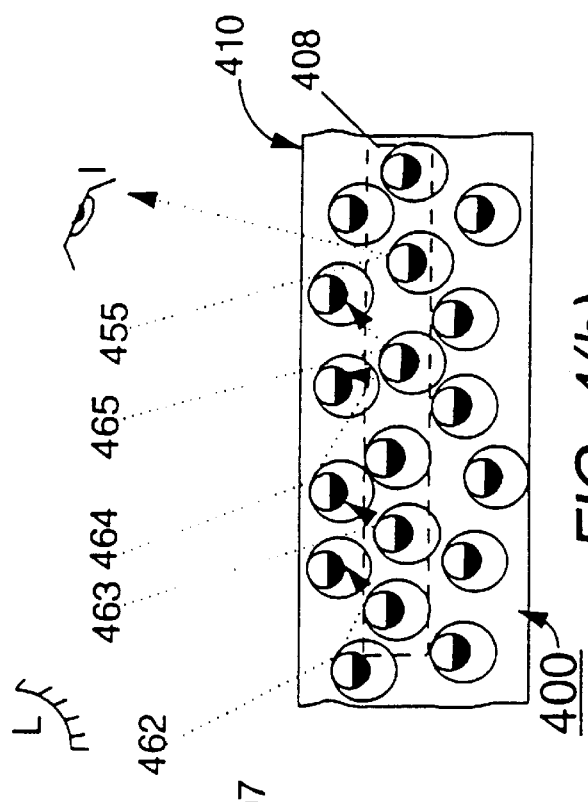
FIGS. 4(*a*)–4(*d*) are a series of views exemplifying light scattering pathways in a gyricon display according to the light rectifier model.
Figure 4B:
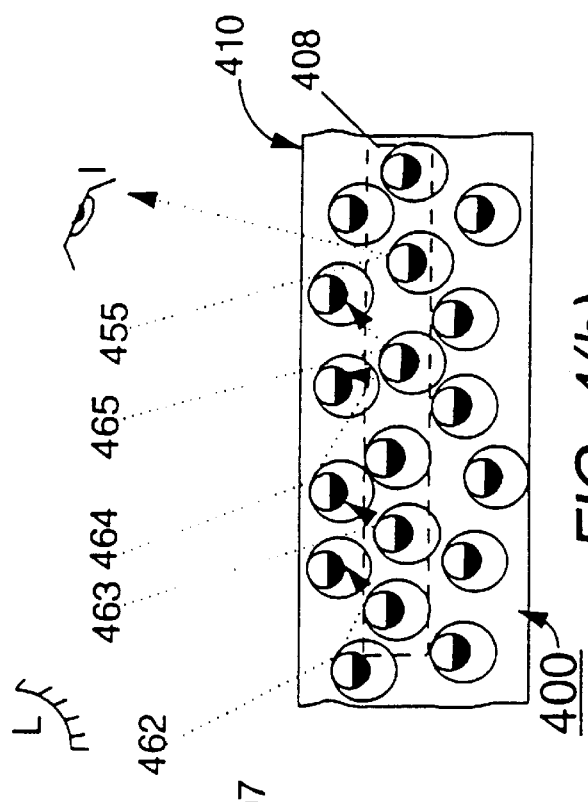
Figure 4C:
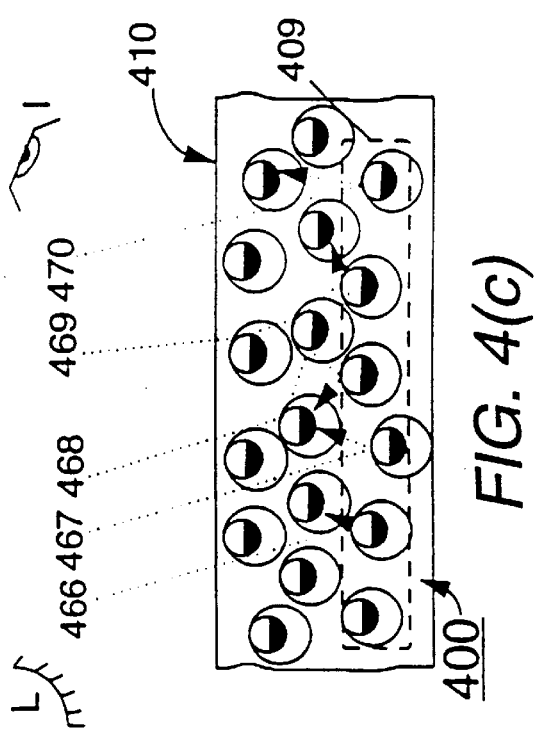
Figure 4D:
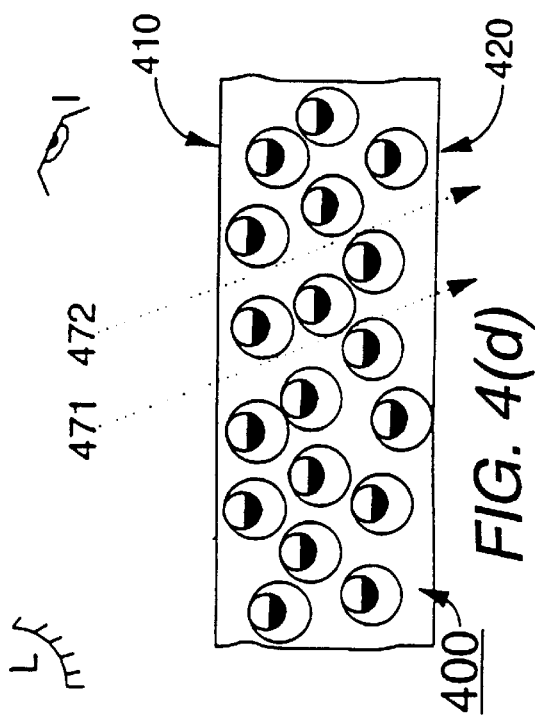

Typically, the bichromal balls used in a gyricon display are white on one hemispherical surface and black on the other. When a portion of the display is in the "white" state, the balls therein are oriented so that their white hemispheres face up (that is, face toward the viewing surface of the display, so as to be visible to an observer located above the display as is the observer at I in FIG. 1). Light coming in from above the display is diffusely scattered in many directions from the tops of the balls.

More particularly, when light strikes a given point on the white hemisphere of a given ball, scattering takes place at all angles bounded by the tangent plane (a plane tangent to the surface of the ball at the point where the light strikes the ball). For a point at the top of the ball, this means that all light is scattered backward. If no other balls are between the given ball and the viewing surface of the gyricon display, light scattered from the top of the ball is free to return outward from the viewing surface and so contributes toward observed whiteness of the display. However, if there are other balls between the given ball and the viewing surface, light scattered from the top of the ball cannot leave the display immediately, because the scattered light is partly intercepted by the black hemispherical surfaces of balls above it. The bottom surfaces are black, so this light is immediately absorbed. Thus much of the light which reaches the lower layers of balls is lost forever.

FIG. 3 illustrates these ideas. Each of the series of views (a), (b), (c), (d) in FIG. 3 shows a portion of gyricon display 300 including bichromal balls 331, 332, 333, and 334, all of which are turned so that their white hemispheres face up towards transparent viewing surface 310. Light rays from a light source L pass through viewing surface 310 to be scattered by the white hemispheres of the bichromal balls. In view (a) light ray 325 strikes a point at the very top of ball 331 and is scattered in all directions bounded by tangent plane $T_1$. Almost all the scattered light can return through surface 310. In view (b) ray 326 strikes a point farther down ball 331 and is scattered in all directions bounded by tangent plane $T_2$. Although most of the scattered light can return through surface 310, some of it is scattered downward and is absorbed by the black hemisphere of ball 332.

Continuing in FIG. 3, in view (c) ray 327 strikes a point on ball 333 and is scattered in all directions bounded by tangent plane $T_3$. Although there are no other balls between ball 333 and surface 310, the white hemisphere of ball 333 is below the black hemispheres of other balls, such as ball 331. A substantial portion of the scattered light is absorbed by the black hemispheres of ball 331 and other balls situated above ball 333 with respect to surface 310. In view (d) ray 328 strikes the top of ball 334 and is scattered in all directions bounded by tangent plane $T_4$. Ball 334 is below several other balls in the display, including balls 331, 332, and 333. Most of the light scattered from white hemisphere of ball 334 is absorbed by the black hermispheres of these other balls, and very little escapes through surface 310.

In short, a conventional gyricon display in the "white" state acts as a light rectifier (analogous to an electrical rectifier). Light entering the device can pass downward easily, but cannot travel back upward without being absorbed. Put another way, once light goes in, in most cases it can't come out. Thus, any light that travels past the upper hemisphere of the topmost bichromal balls without being reflected is unlikely to escape the device. Adding bichromal balls below the topmost ones will contribute only minimally to overall display reflectance.

FIG. 4 illustrates various exemplary pathways for scattered light rays in gyricon displays according to the light rectifier model. (For clarity, only selected exemplary scattering pathways are shown; it will be understood that, as in FIG. 3, each light ray incident on the white hemisphere of a ball scatters at all angles bounded by the tangent plane at the point of incidence.) Each of the series of views (a), (b), (c), (d) in FIG. 4 shows a portion of gyricon display 400, which is illuminated by light from diffuse illumination source L. The bichromal balls 407, 408, 409 in display 400 are turned so that their white hemispheres are exposed to an observer at I. Balls 407 can be said to be the top or first layer of balls in display 400, balls 408 can be said to be the second layer, and balls 409 the third layer.

In view (a) of FIG. 4, light rays 451, 452, 453, 454, 461 are incident on the topmost balls 407. No other balls lie between balls 407 and transparent viewing surface 410. Rays 451, 452, and 453 scatter immediately back to the observer at I. Ray 454 scatters from one ball and onto the white hemisphere of another ball, and thence back to the observer at I. Ray 461 strikes ball 437, a ball whose white hemisphere is somewhat lower than the black hemispheres of most of the other topmost balls 437. Ray 461 scatters off the white hemisphere of ball 437 and is absorbed by the black hermisphere of ball 438.

According to the light rectifier model, most of the light rays incident on topmost balls 407 (such as rays 451, 452, 453, and 454) are reflected so as to be visible to the observer at I; only a small portion of the rays incident on topmost balls 407 (for example, ray 451) are lost to absorption. Absorptive losses are more substantial for balls (such as ball 437) that are situated below, rather than at the same depth as, the other balls in the top layer, and are particularly large for balls whose reflective white hemispheres lie below the absorptive black hemispheres of neighboring balls.

Continuing in FIG. 4, in view (b) light rays 462, 463, 464, 465, 455 are incident on balls 408. Some of these rays, such as rays 463, 465, and 455, travel directly from light source L to balls 408 while others, such as rays 462 and 464, arrive indirectly after being scattered from topmost balls 407, which lie between balls 408 and transparent viewing surface 410. Rays 462, 463, 464, and 465 each scatter from the white hemisphere of one of the second-layer balls 408, but are then absorbed by the black hemispheres of topmost balls 407, and so do not escape to surface 410. Thus these rays 452, 463, 454, 465 are not visible to the observer at C. A few rays, such as ray 455, do escape to surface 410 and so are visible to the observer at 0, but according to the light rectifier model such rays are the exception, not the rule. Most of the light rays incident on second-layer balls 408 are lost to absorption by topmost balls 407, and so second-layer balls 408 appear relatively dark to the observer at I.

In view (c) of FIG. 4, light rays 466, 467, 468, 469, 470 are incident on balls 409. Some of these rays, such as rays 466 and 467, travel directly from light source L to balls 409 while others, such as rays 468, 469 and 470, arrive indirectly after being scattered from topmost balls 407 or second-layer balls 408, both of which lie between balls 409 and transparent viewing surface 410. Rays 466, 467, 468, 469, 470 each scatter from the white hemisphere of one of the third-layer balls 409, but are then absorbed by the black hemispheres of topmost balls 407 or second-layer balls 408, and so do not escape to surface 410. Thus none of rays 466, 467, 468, 469, 470 is visible to the observer at I. Almost all of the light rays incident on third-layer balls 409 are lost to absorption by balls in upper layers, and so the third-layer balls 409 appear quite dark to the observer at I.

Finally, in view (d) of FIG. 4, light rays 471, 472 pass entirely through gyricon display 400 without encountering any of balls 407, 408, or 409. These rays pass through gaps between the balls and are not reflected (e.g., they are absorbed behind rear surface 420 of the display). Thus they are not visible to the observer at I.

Monolayer Gyricon Displays

According to the light rectifier model, light rays not reflected by the white hemispheres of the topmost balls of a gyricon display (and, more particularly, by balls whose white hemispheres are not below the black hemispheres of other balls) are very likely to be lost to absorption.

According to the invention, the light rectifier properties inherent in conventional gyricon displays can be overcome by constructing a gyricon display in which all the bichromal balls are disposed in a single layer, at the same depth from the viewing surface, and packed as closely together as possible within that layer. In such a display, when white ball hemispheres are presented to the observer, the light rays that are reflected towards the viewing surface do not penetrate the display beyond the upper hemisphere of the single layer of balls. By packing the balls closely together, the amount of light that is reflected from the single layer is maximized, and the amount that is absorbed by the black hemispheres of the balls or is transmitted through the display without reflection is minimized.

FIG. 5 illustrates exemplary light scattering pathways in various gyricon displays. (For clarity, as in FIG. 4, only selected pathways are shown.) View (a) shows an ideal close-packed monolayer gyricon display 500 with bichromal balls 501. The surfaces of neighboring balls touch each other, or come as close as possible to touching each other as is consistent with proper ball rotation. The only gaps between balls 501 are the spaces that inherently arise when spheres are packed into a planar array. Preferably, to minimize these gaps, a hexagonal array is used. Display 500 can be built by placing the balls 501 directly in the dielectric fluid without an elastomer, as will be described below with reference to FIG. 21. Rays 550, 551, 552, 553, and 554 from diffuse light source L scatter from the upper white hemispheres of balls 501 and back out of display 500, thereby contributing to the observable brightness of the display.

Continuing in FIG. 5, view (b) shows a high-quality (i.e., high-brightness) close-packed monolayer gyricon display 510 in which bichromal balls 511 rotate within cavities 512. Cavities 512 can be formed, for example, by the swelled-elastomer techniques used in constructing conventional gyricon displays. Bichromal balls 511 are preferably disposed in a planar hexagonal array, and cavities 512 are made as small as possible with respect to balls 511. Also, cavities 512 are placed as close to one another as possible, preferably with the walls between neighboring cavities being made as thin as possible and ideally approaching zero thickness. Thus the gaps between balls 511 are minimized. Rays 555, 556, 557, 558, and 559 from diffuse light source L scatter from the upper white hemispheres of balls 511. Most of the incident rays are scattered back out of the display so as to contribute to display brightness. A few pass through the gaps between balls 511 without being reflected (e.g., ray 559) or are absorbed by black hemispheres of balls 511 (not shown).

Further in FIG. 5, view (c) shows a monolayer gyricon display 520 of lesser quality, in which the bichromal balls are not as closely packed as in displays 500 and 510. Balls 521 rotate within cavities 522; the spacing between adjacent cavities is relatively large with respect to the ball diameter. Therefore, more light is lost than in displays 500 and 510. Rays 560 and 562 pass through the gaps between balls 521, and ray 563 is scattered so as to be absorbed by the black hemisphere of one of balls 521. In general, the farther apart the balls 521 are spaced, the greater the losses due to transmission through the display and and absorption of sideways-scattered light by the black hemispheres of the bichromal balls. The spacing between neighboring bichromal balls can be large either because of large-sized cavities or, as shown in view (c) large spaces between adjacent cavities.

View (d) of FIG. 5 illustrates an alternative embodiment of the invention that provides an alternative solution to the light rectifier problem. Gyricon display 540 has a thick arrangement of bichromal balls including top layer 547, middle layer 548, and bottom layer 549. The balls in top layer 547 are close-packed in the same way as the balls 511 in the single layer of display 510 (from view (b)). The balls in layers 548 and 549 are not close-packed. However, almost all the light observably reflected from display 540 is reflected from the upper white hemisphere of balls in top layer 547, so layers 548 and 549 do not contribute substantially to the reflectance of display 540. Thus the reflectance of display 540 is about as good as that of display 510. Even so, for reasons discussed below with reference to FIG. 14, the thinner display 510 is to be preferred over the thicker display 540.

To summarize: According to the light rectifier model, light incident on the viewing surface of a gyricon display must be reflected by the white hemispheres of the topmost bichromal balls if it is to contribute to observable display brightness. Any light not so reflected is effectively trapped inside the gyricon display, because it is absorbed by the black hemispheres of the bichromal balls before it can reach the surface, or because it passes through the display without being reflected at all. Although a small amount of the light scattered by the white hemispheres of balls in lower layers manages to reach the surface, the observed low reflectance of conventional gyricon displays, which cannot be accounted for even when other known light-loss mechanisms are taken into consideration, suggests that the amount of light that does escape is quite small. To overcome the reflectance limitations of conventional gyricon displays, according to the invention a gyricon display is built that does not act as a light rectifier. In the "white" state, the inventive display reflects entirely from the topmost layer of bichromal balls and, more particularly, from the white hemispherical upper surfaces of the topmost layer of balls. In a preferred embodiment, the inventive display is constructed with a single close-packed monolayer of bichromal balls.

Examples of Specific Embodiments

Figure 6:
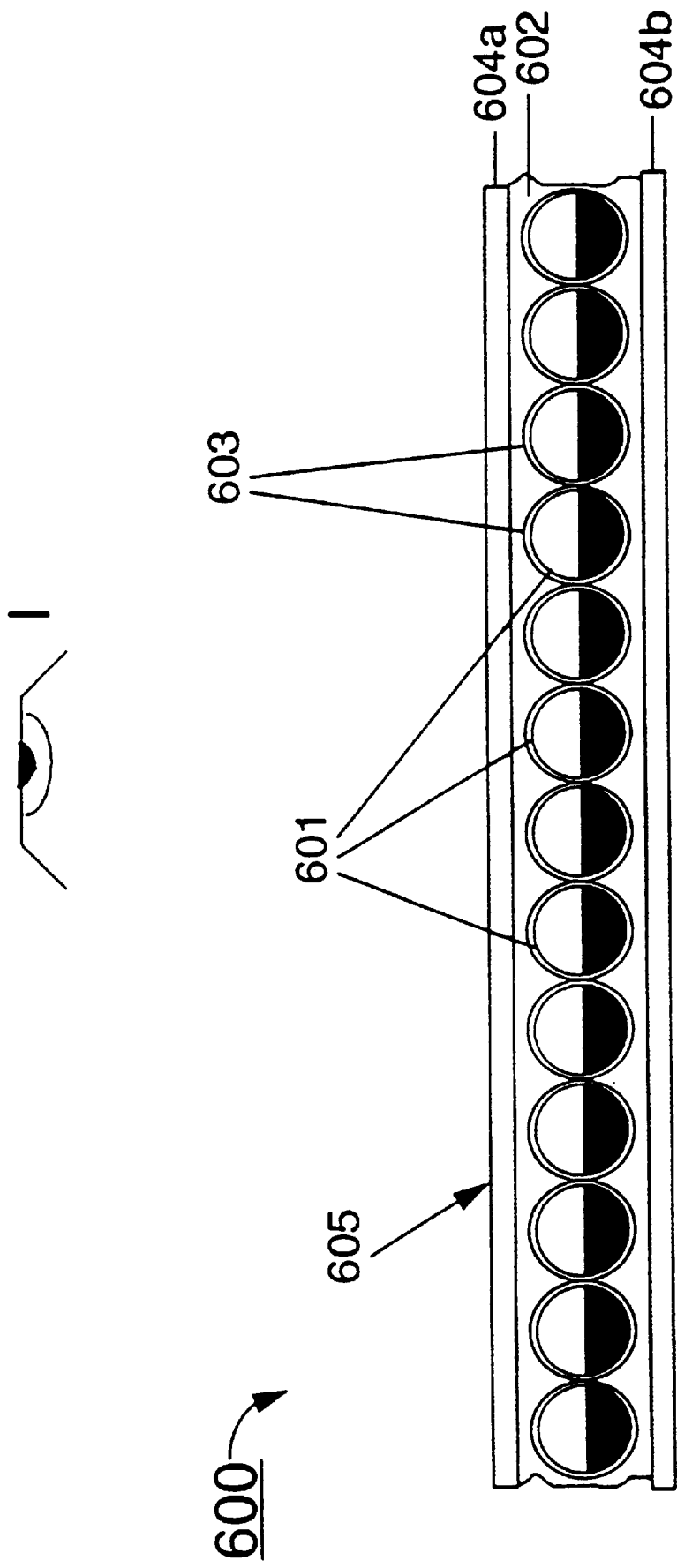
FIG. 6 illustrates a side view of a gyricon display of the present invention in an embodiment wherein the gyricon balls are arrayed in a close-packed monolayer.

FIGS. 3–5 depict their respective gyricon displays in simplified form, so that the light pathways therein can be clearly seen. FIG. 6 provides a more detailed side view of a gyricon display 600 of the invention in a specific embodiment. In display 600, bichromal balls 601 are placed as close to one another as possible in a monolayer in elastomer substrate 602. Substrate 602 is swelled by a dielectric fluid (not shown) creating cavities 603 in which the balls 601 are free to rotate. The cavities 603 are made as small as possible with respect to balls 501, so that the balls nearly fill the cavities. Also, cavities 603 are placed as close to one another as possible, so that the cavity walls are as thin as possible. Preferably, balls 601 are of uniform diameter and situated at a uniform distance from upper surface 605. It will be appreciated that the arrangement of balls 601 and cavities 603 in display 600 is comparable to that of balls 511 and cavities 512 in display 510 shown in view (b) of FIG. 5. It will further be appreciated that the arrangement of balls 601 and cavities 603 in display 500 minimizes both the center-to-center spacing and the surface-to-surface spacing between neighboring bichromal balls. (A more detailed discussion of the relative dimensions of the balls and the cavities within which they rotate will be provided below with reference to FIG. 17.)

Balls 601 are electrically dipolar in the presence of the dielectric fluid and so are subject to rotation upon application of an electric field, as by matrix-addressable electrodes 604a, 604b. The electrode 604a closest to upper surface 605 is preferably transparent. An observer at I sees an image formed by the black and white pattern of the balls 601 as rotated to expose their black or white hemispheres to the upper surface 605 of substrate 602.

Figure 7:
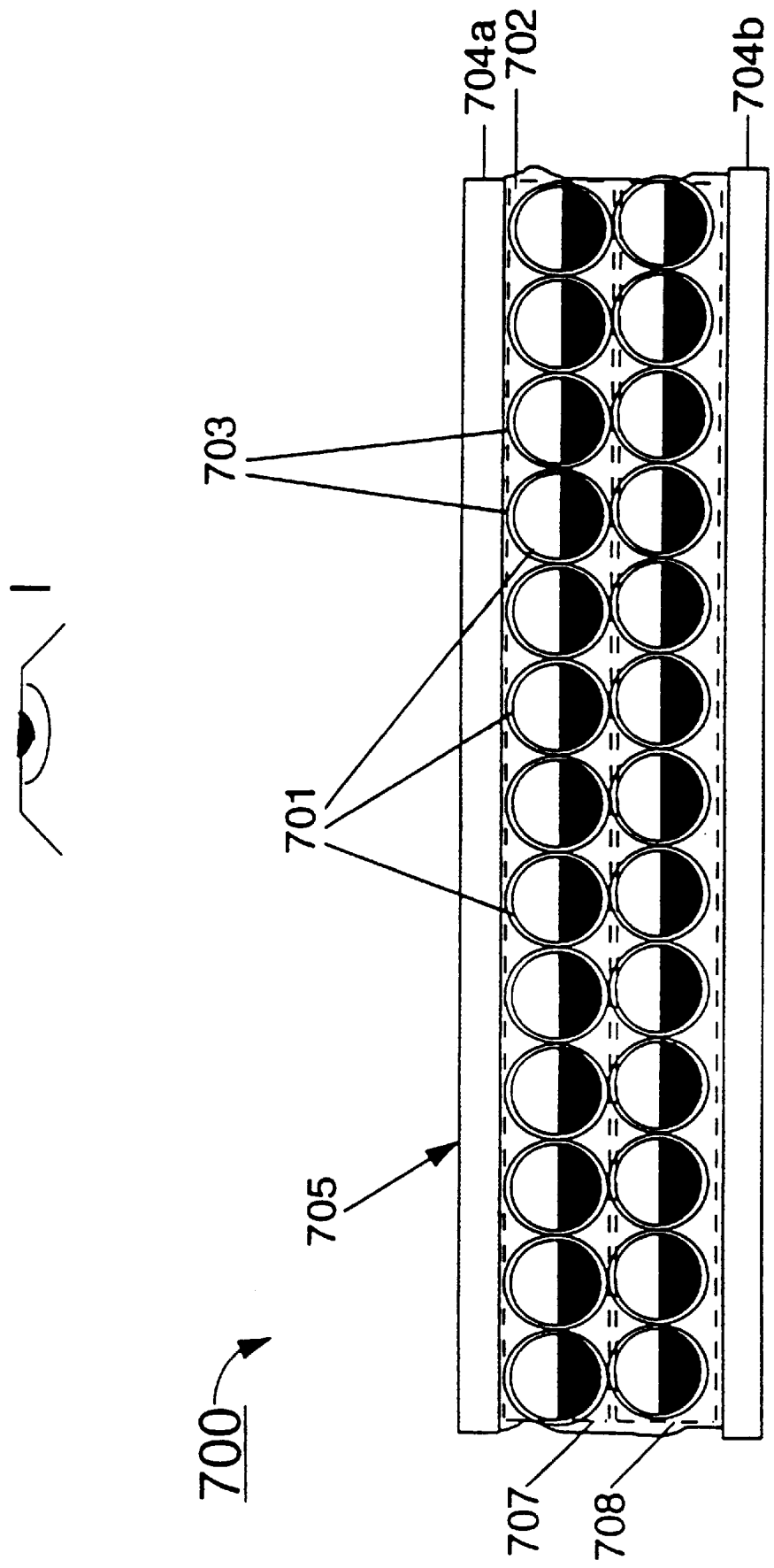
FIG. 7 illustrates a side view of a gyricon display of the present invention in an alternative embodiment wherein the gyricon balls are arrayed in multiple layers with a close-packed monolayer as the layer closest to the viewing surface.

FIG. 7 shows a side view of a gyricon display 700 of the invention in an alternative embodiment. In display 700, bichromal balls 701 are in a top layer 707 and additional lower layers (here represented by second layer 708). Balls in top layer 707 are placed as close to one another as possible in a monolayer. Elastomer substrate 702 is swelled by a dielectric fluid (not shown) creating cavities 703 in which the balls 701 are free to rotate. Cavities 703 are made as small as possible with respect to balls 701, and particularly with respect to balls in top layer 707, so that these balls nearly fill the cavities. Also, cavities 703 are placed as close to one another as possible, so that the cavity walls are as thin as possible. Preferably, balls in top layer 707 are of uniform diameter and are situated at a uniform distance from upper surface 703. It will be appreciated that the arrangement of balls and cavities in top layer 707 of display 700 is comparable to that of balls and cavities in top layer 547 in display 540 shown in view (d) of FIG. 5. It will further be appreciated that almost all the light reflected from display 700 so as to be observable to an observer at I is reflected from the white hemispheres of balls in top layer 707. At least for top layer 707, the arrangement of balls 701 and cavities 703 in display 700 minimizes both the center-to-center spacing and the surface-to-surface spacing between neighboring bichromal balls. Preferably, balls in the lower layers (such as layer 708) are also close-packed insofar as possible, in order to minimize display thickness.

Balls 701 are electrically dipolar in the presence of the dielectric fluid and so are subject to rotation upon application of an electric field, as by matrix-addressable electrodes 704a, 704b. The electrode 704a closest to upper surface 703 is preferably transparent. An observer at I sees an image formed by the black and white pattern of the balls 701 as rotated to expose their black or white hemispheres to the upper surface 705 of substrate 702.

Figure 14A:
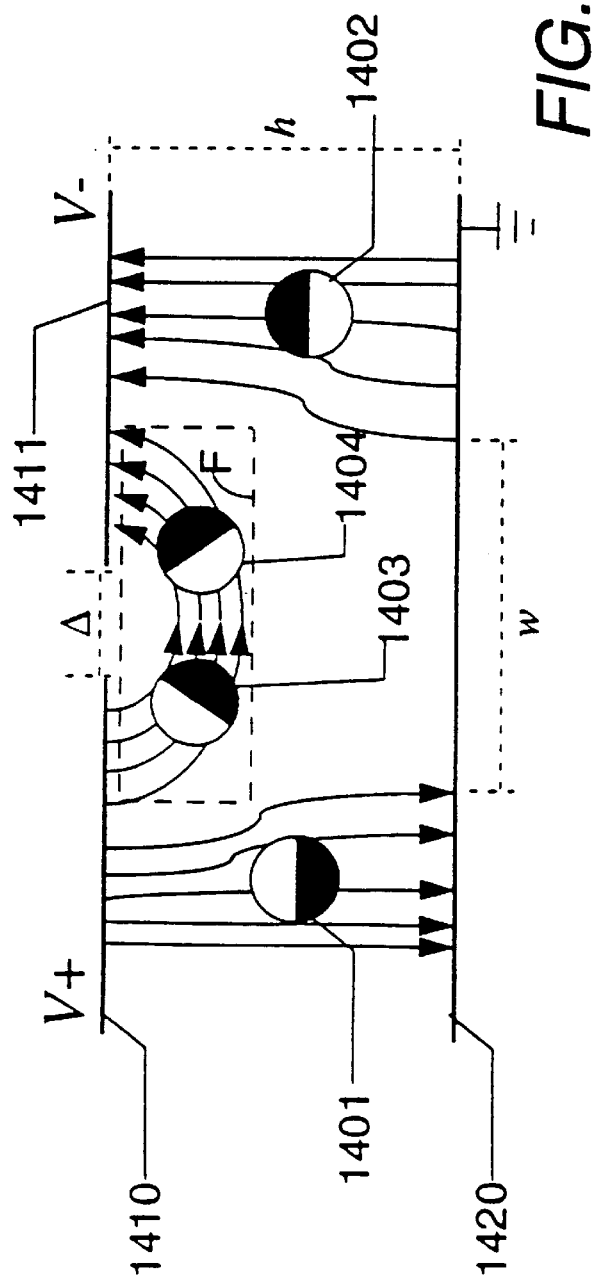
FIGS. 14(a)–14(b) are a series of views contrasting the fringing fields in thick gyricon displays with the fringing fields in monolayer gyricon displays.
Figure 14B:
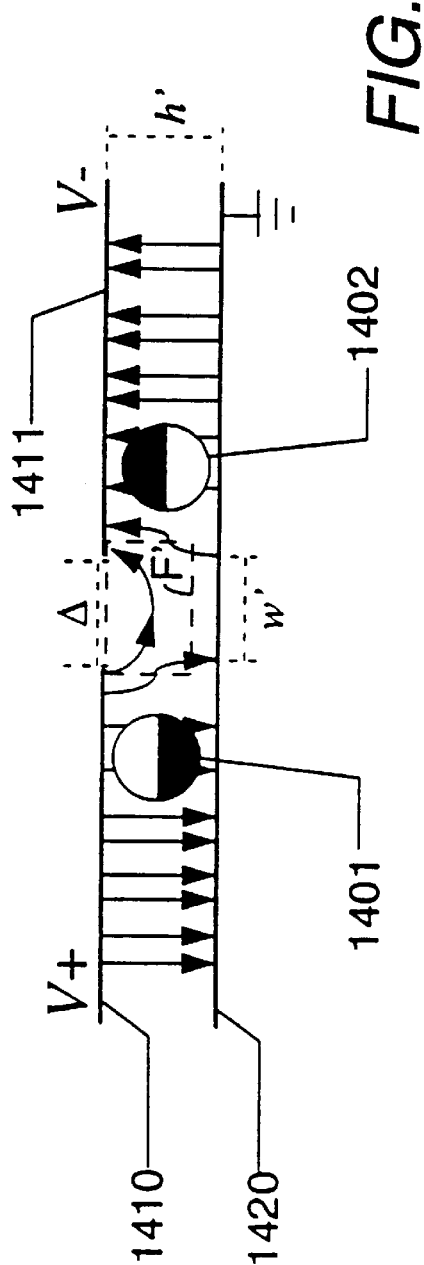

In general, monolayer display 600 of FIG. 6 is preferable to the thicker display 700 of FIG. 7, for reasons discussed below with reference to FIG. 14. According to the light rectifier model, the lower layers, such as layer 708, contribute little or nothing to observable display reflectance. Note in particular that the white hemispheres of balls in lower layer 708 are situated so that any light that does reach them is most likely to be scattered into the absorptive dark sides of balls in top layer 707. Nevertheless, there can be situations where a display such as display 700 is preferred, for example, if such a display can be manufactured at less expense.

Figure 8:
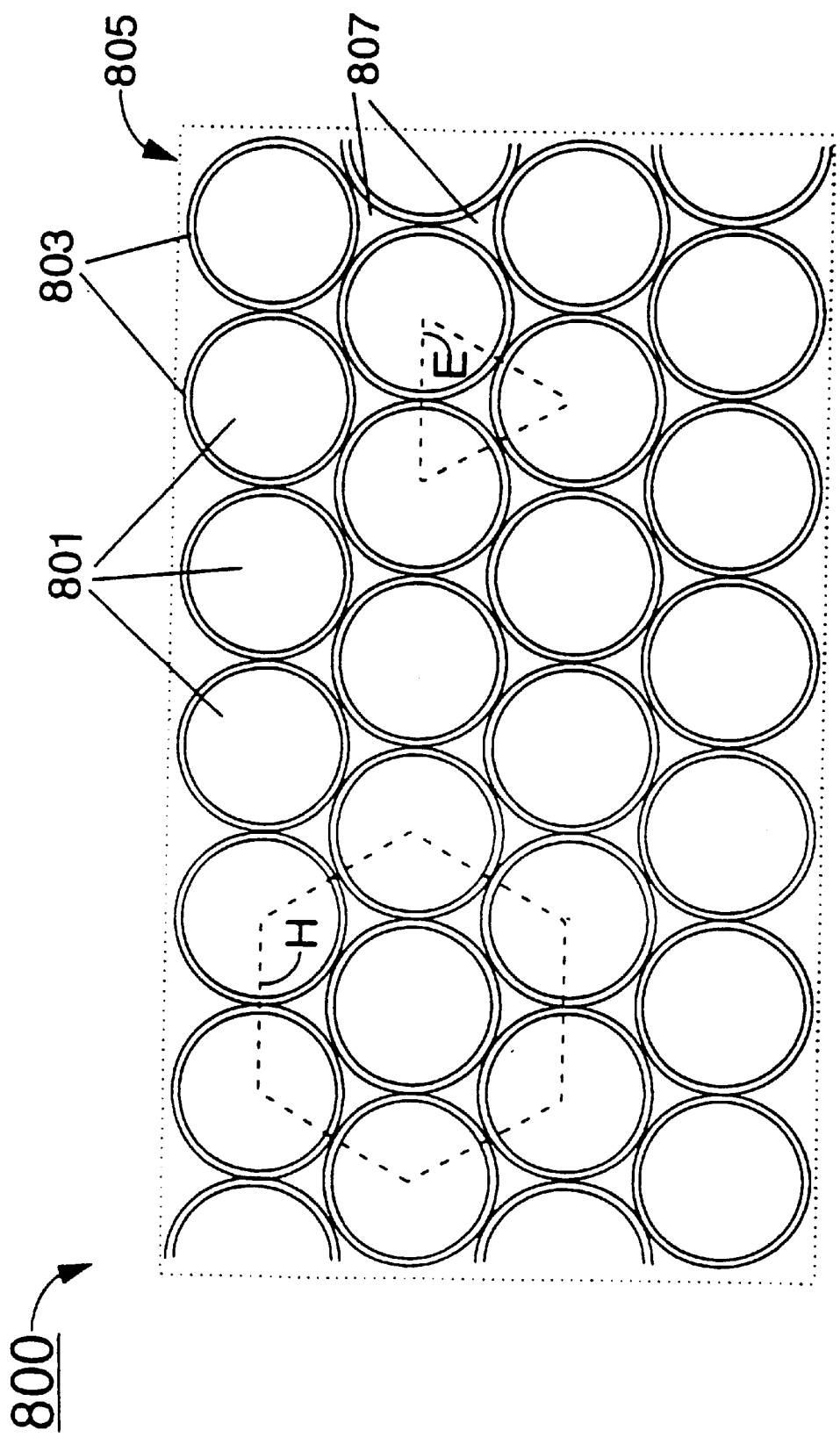
FIG. 8 illustrates a top view of a gyricon display of the present invention in an embodiment wherein the gyricon balls nearest the viewing surface are arrayed in a close-packed hexagonal formation.

To maximize the closeness of packing of the bichromal balls in the monolayer of display 600 or the close-packed top layer of display 700 a hexagonal packing geometry is preferred. FIG. 8 illustrates this geometry. A top view of a portion of a gyricon display 800 of the invention is shown, with the white hemispheres of the balls 801 visible through transparent viewing surface 80 Balls 801 rotate in cavities 803 which cavities are preferably as small and close together as possible. The centers of balls 801 form a hexagonal pattern as shown by exemplary hexagon H; that is, the centers of close neighboring balls form equilateral triangles, as shown by exemplary equilateral triangle E. Interstices 807 occur as a result of the geometry (packed spheres cannot cover a plane entirely).

Figure 9:
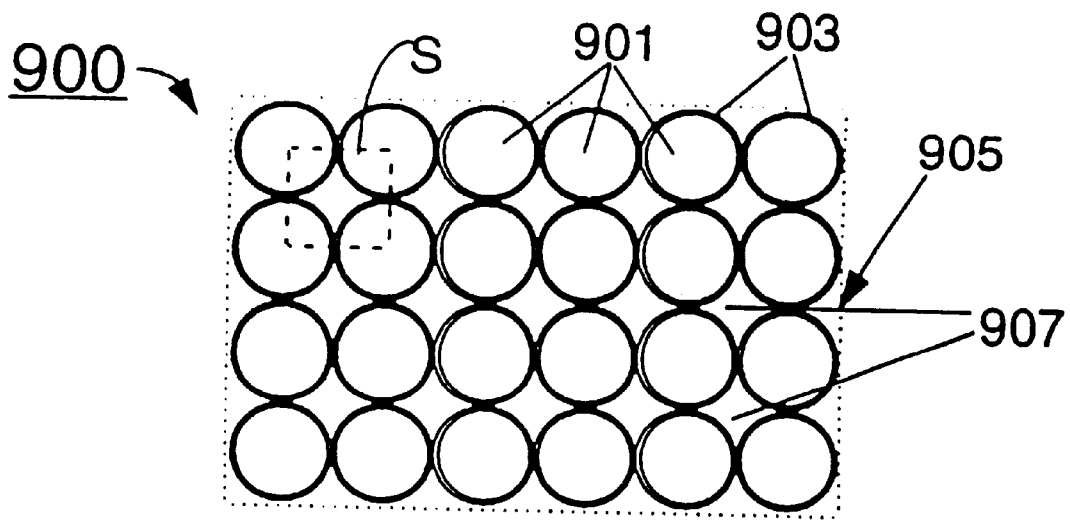
FIGS. 9 and 10 illustrate top views of gyricon displays of the present invention in alternative embodiments wherein the gyricon balls are arrayed, respectively, in a close-packed rectangular formation and in a close-packed rhomboidal (diamond-shaped) formation.
Figure 10:
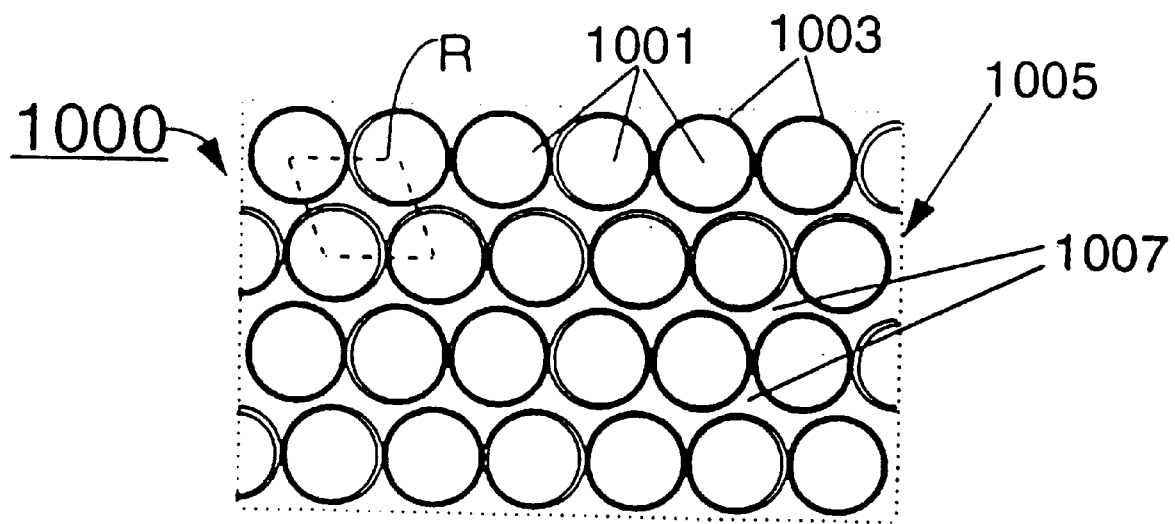
Figure 11B:
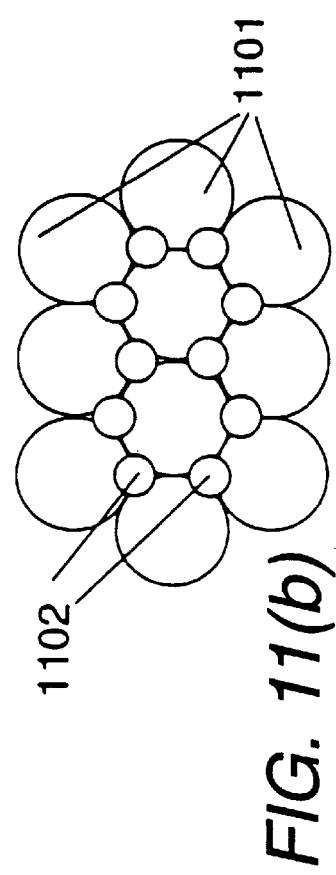
FIGS. 11(a)–11(f) are a series of views illustrating examples of gyricon displays each having two different populations of bichromal balls, with smaller-diameter bichromal balls filling the interstices of an ideal close-packed monolayer of larger-diameter bichromal balls.
Figure 11D:
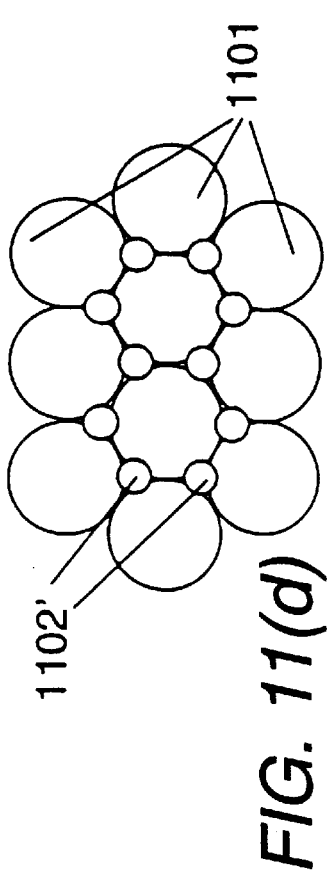
Figure 11F:
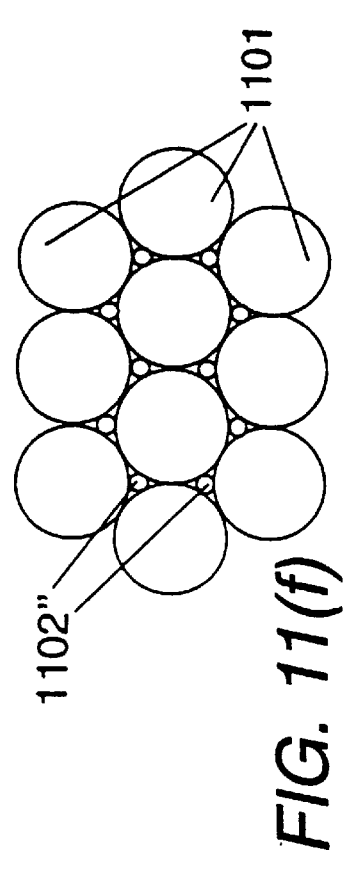
Figure 11A:
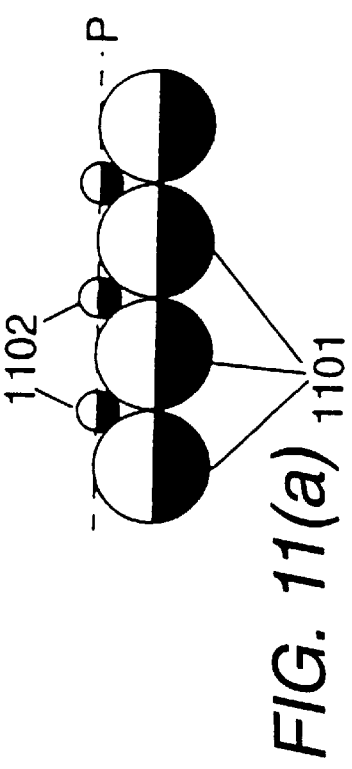
Figure 11C:
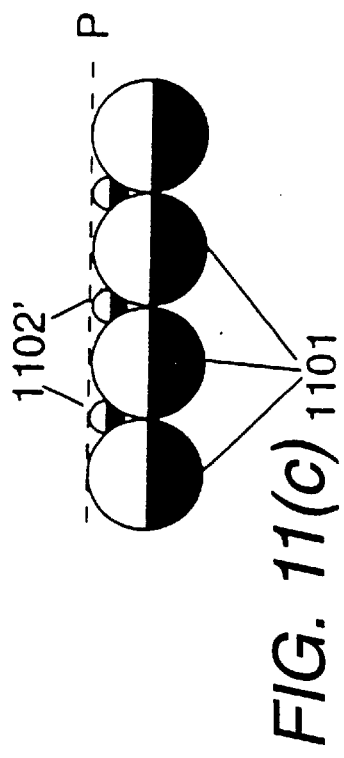
Figure 11E:
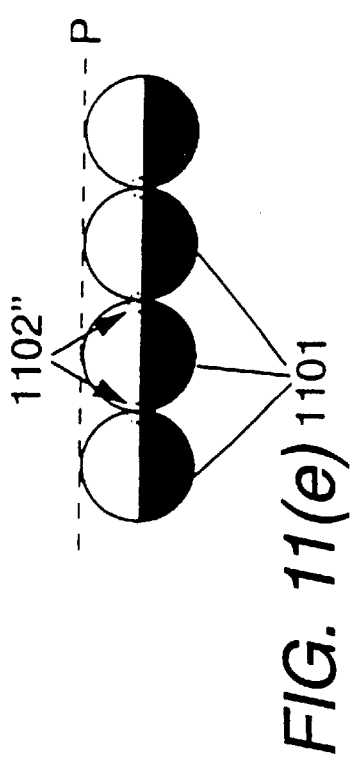

FIGS. 9–10 illustrate alternative packing geometries. These geometries are less preferred than the hexagonal geometry of FIG. 8, because they cover a smaller proportion of the plane than is covered by the hexagonal geometry. FIG.

9 shows a rectangular geometry. A portion of gyricon display 900 has bichromal balls 901 in cavities 903. The white hemispheres of balls 901 are visible through viewing surface 905. The rectangular geometry is shown by exemplary square S formed by the centers of balls 901. Interstices 907 are left unfilled by the packing geometry. FIG. 10 shows a rhomboidal (diamond-shaped) geometry. A portion of gyricon display 1000 has bichromal balls 1001 in cavities 1003. The white hemispheres of balls 1001 are visible through viewing surface 1005. The rhomboidal geometry is shown by exemplary rhombus R formed by the centers of balls 1001. Interstices 1007 are left unfilled by the packing geometry.

Two-Population Close-Packed Gyricon Displays

A monolayer planar array of spheres of uniform diameter inevitably has interstices between the spheres, even if the sphere surfaces touch one another. In FIG. 8, interstices 807 are formed by the hexagonal packing geometry. In FIG. 9, interstices 907 are formed by the rectangular packing geometry. In FIG. 10, interstices 1007 are formed by the rhomboidal packing geometry. According to the light rectifier model, light that passes through the interstices into the depths of the display is essentially lost.

To prevent light loss through interstices in the planar array, according to the invention in another embodiment a gyricon display is constructed from two populations of bichromal balls. Preferably, balls in the first, or main, population are of a first uniform diameter and balls in the second, or interstitial, population are of a second uniform diameter, with the second diameter chosen so that the balls in the second population can fill the interstices left by close-packing the balls from the first population.

FIG. 11 provides some examples of these ideas. Each of the series of views in FIG. 11 illustrates a hexagonally packed planar array of bichromal balls 1101 with various smaller bichromal balls being used to fill the interstices of the array. The white hemispheres of balls 1101 face upwards, and their topmost points lie in a plane P. Views (a) and (b) show, respectively, side and top views of the array of bichromal balls 1101. Smaller bichromal balls 1102 are situated above balls 1101 (that is, closer to the viewing surface of the gyricon display) in the interstices formed by the hexagonal packing arrangement. Balls 1102 also have their white hemispheres facing upwards. Balls 1102 are of a diameter such that the plane that separates their white and black hemispheres is plane P. Views (c) and (d) show, respectively, side and top views of the array of bichromal balls 1101 with smaller bichromal balls 1102' situated above balls 1101 in the interstices formed by the hexagonal packing arrangement. Balls 1102' are of a diameter such that their topmost points lie in plane P. Views (e) and (f) show, respectively, side and top views of the array of bichromal balls 1101 with smaller bichromal balls 1102" situated above balls 1101 in the interstices formed by the hexagonal packing arrangement. (In view (a), balls 1102 are hidden by balls 1101 and, accordingly, are shown as dashed outlines.) Balls 1102" are of a diameter such that their surfaces are tangential to the surfaces of balls 1101 when their centers are coplanar with the centers of balls 1101, as shown.

Preferably, as shown in all the examples of FIG. 11, interstitial balls are situated in a planar array above the planar array of the main bichromal balls. That is, the plane formed by the centers of the smaller balls is closer to the viewing surface than the plane formed by the centers of the monolayer (or close-packed top layer) of larger balls. With this arrangement, light reflected from the white hemispheres of the interstitial balls is not absorbed by the black hemispheres of the main bichromal balls, as would be the case if the interstitial balls were disposed below the layer of larger balls.

Further as shown in FIG. 11, the interstitial balls preferably are small enough so that their black hemispheres do not absorb much of the light reflected by the white hemispheres of the main bichromal balls. In this regard, a tradeoff can be made between losses due to absorption by the black hemispheres of the interstitial balls and losses due to passage of light through unfilled portions of the interstices. In views (a) and (b) of FIG. 11, balls 1102 almost completely fill the interstices between balls 1101. However, some of the light scattered from the white hemispheres of balls 1101 is absorbed by the black hemispheres of balls 1102. (Note that plane P, which is the tangent plane for the tops of balls 1101 is also the plane separating the black and white hemispheres of the interstitial balls 1102. Thus none of the light scattered from the very tops of balls 1101 is absorbed by the black hemispheres of balls 1102. This would not be so if balls 1102 were made any larger.) In views (c) and (d) of FIG. 11, balls 1102' largely fill the interstices between balls 1101. Some of the light scattered from the white hemispheres of balls 1101 is absorbed by the black hemispheres of balls 1102', but less so than for interstitial balls 1102 in views (a) and (b). This is because balls 1102 being smaller than balls 1102, can be situated with their centers below plane P, so that light scattered by the white hemispheres of balls 1101 is less likely to reach the black hemispheres of balls 1102' than the black hemispheres of balls 1102. In views (a) and (1) of FIG. 11, balls 1102" only partly fill the interstices between balls 1101. Balls 1102 are situated with their centers in the same plane as the centers of balls 1101, so very little of the light scattered from the white hemispheres of balls 1101 is absorbed by the black hemispheres of balls 1102". However, light can pass through the portions of the interstices between balls 1101 that are left unfilled by balls 1102". Therefore, with interstitial balls 1102 more light is transmitted beyond the white hemispheres of balls 1101 than is the case with the larger interstitial balls 1102 or 1102'.

In short, as the interstitial balls are made smaller, they can be situated lower with respect to the tops of the main bichromal balls, and so can be made to absorb less light with their black hemispheres. However, as the interstitial balls are made smaller, they fill a smaller part of the interstitial gaps between the main bichromal balls, and so allow more light to pass beyond one hemisphere's depth in the main layer, thereafter to be lost to absorption.

Figure 12:
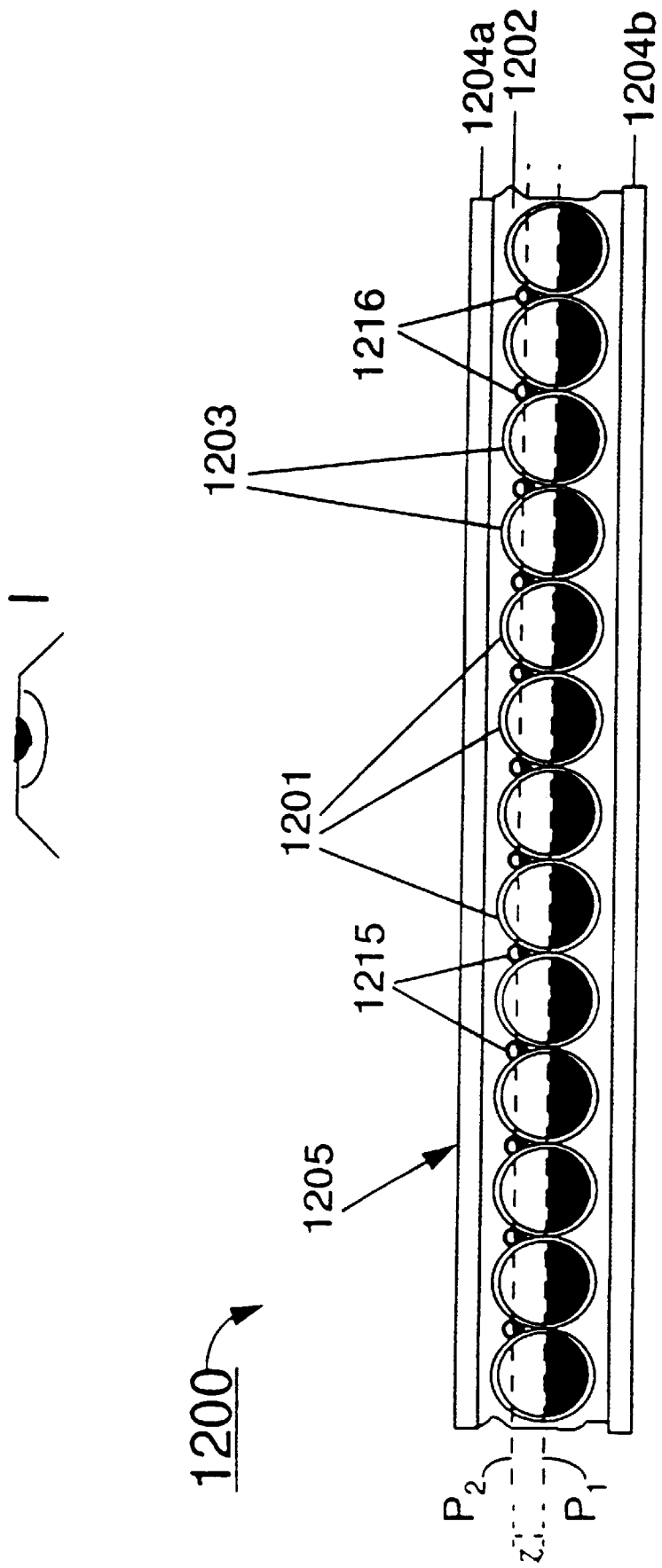
FIG. 12 illustrates a side view of a gyricon display of the present invention in an embodiment wherein relatively large gyricon balls are arrayed in a close-packed formation, and relatively small gyricon balls fill the interstices of the formation.

FIG. 12 provides a more detailed side view of a gyricon display 1200 of the invention in a specific embodiment with main and interstitial bichromal balls. In display 1200 main bichromal balls 1201 are placed as close to one another as possible in a monolayer in elastomer substrate 1202. Substrate 1202 is swelled by a dielectric fluid (not shown) creating cavities 1203 in which the balls 1201 are free to rotate. The cavities 1203 are made as small as possible with respect to balls 1201 so that the balls nearly fill the cavities. Also, cavities 1203 are placed as close to one another as possible, so that the cavity walls are as thin as possible. Preferably, balls 1201 are of uniform diameter and situated at a uniform distance from upper surface 1205.

The arrangement of balls 1201 and cavities 1203 in display 1200 is comparable to that of balls 601 and cavities 603 in display 600 shown in FIG. 6. However, display 1200 differs from display 600 by the addition of small interstitial balls 1215, which rotate in their own cavities 1216 created by swelling of elastomer substrate 1202 in the presence of the dielectric fluid. Balls 1215 rotate together with balls 1201 upon application of an electric field, so that when the white hemispheres of balls 1201 are presented to an observer at I, the white hemispheres of balls 1215 are also presented, and similarly for the black hemispheres.

Preferably balls 1215 are of uniform diameter and are situated at a uniform distance from upper surface 1205, with the plane $P_2$ containing the centers of balls 1215 being closer to surface 1205 than the plane $P_1$ containing the centers of balls 1201. The distance z between the plane $P_2$ containing the centers of balls 1215 and the plane $P_1$ containing the centers of balls 1201 is preferably minimized, so that balls 1215 are as close to balls 1201 as possible, thus minimizing absorptive losses due to light scattering from the white hemispheres of balls 1201 into the black hemispheres of balls 1215. Cavities 1216 are made as small as possible with respect to balls 1215, so that the balls nearly fill the cavities, and the walls of cavities 1215 are made as thin as possible.

Figure 13:
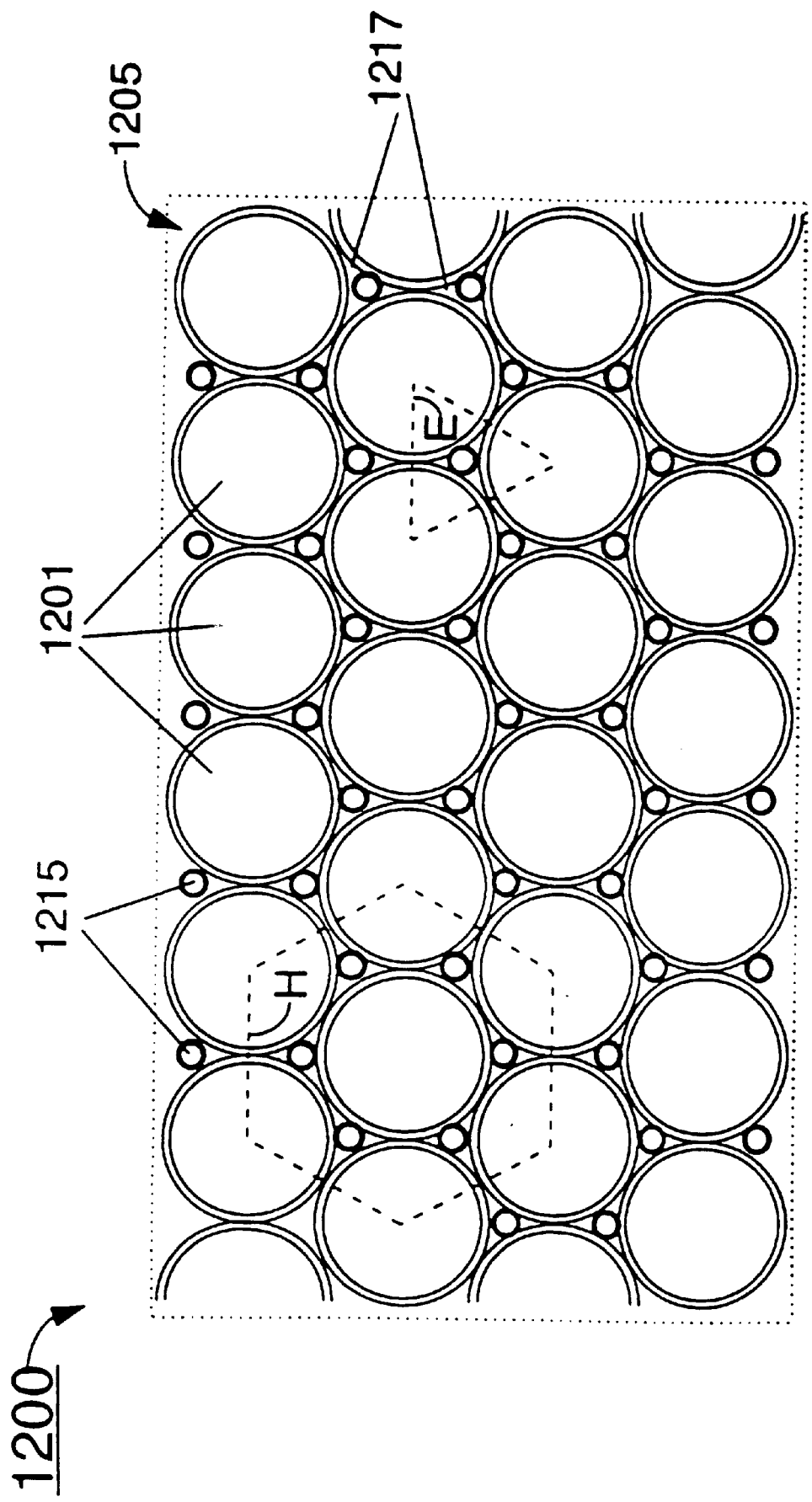
FIG. 13 illustrates a top view of a gyricon display of the present invention in an embodiment wherein relatively large gyricon balls are arrayed in a close-packed hexagonal formation, and relatively small gyricon balls fill the interstices of the formation.

FIG. 13 shows a top view of a portion of display 1200. The white hemispheres of main bichromal balls 1201 and interstitial bichromal balls 1215 can be seen through transparent surface 1205. Preferably, a hexagonal packing geometry is used for balls 1201 as indicated by hexagon H and equilateral triangle E. Interstitial balls 1215 fill the interstices 1217 left between balls 1201 in the hexagonal packing geometry. As previously discussed in connection with FIG. 11, balls 1215 can fill a greater or lesser portion of the interstices 1217, depending on the relative diameters of balls 1201 and balls 1215.

It will be apparent from FIGS. 11–13, when considered together with the earlier figures (esp. FIGS. 8–10), that many alternative embodiments are possible for interstitial packing of two populations of bichromal balls in a gyricon display according to the invention. In particular, the main bichromal balls can be packed in rectangular or rhomboidal geometries, and can be either a monolayer of balls or the close-packed top layer of a thick arrangement of balls. In all these embodiments, the basic idea is to intercept incoming light that would otherwise be lost in the interstices and reflect it to the observer, either directly or by scattering from nearby white hemispheres of larger balls, while preferably minimizing absorptive losses due to the black hemispheres of the smaller balls.

Electrical Advantages of Monolayer Construction

A monolayer gyricon display according to the invention has advantages in addition to improved reflectance. The operating voltage needed for such a display is less than the voltage needed for a conventional thick gyricon display. This is because the rotation of gyricon balls under the influence of an electric field depends on the field strength. Electric field is the derivative of voltage with respect to distance (for example, in the simple case of a parallel plate capacitor, E=V/d). Thus a given electric field strength can be achieved with a lower applied voltage, other things being equal, by reducing the distance over which the voltage is applied. Accordingly, by using the thinnest configuration possible, which is a monolayer, the operating voltage of the gyricon display is minimized. A lower operating voltage has many advantages, including lower power consumption, less expensive drive electronics, and increased user safety.

The addition of interstial balls to the display need not result in increased operating voltage over what is required for the monolayer display. (For example, the drive voltage for interstitially packed display 1200 of FIG. 12 can be the same or comparable to the voltage used to drive monolayer display 600 of FIG. 6.) Commonly, the minimum electric field strength that must be applied to cause rotation of the smaller balls is no greater than the minimum field strength for the larger balls. Therefore, so long as the addition of the smaller balls to the display does not increase the overall substrate thickness, the voltage need not be increased. For example, the interstitial arrangements shown in views (C) and (s) of FIG. 11 can be situated in substrates no thicker than the substrate needed for a simple monolayer of balls 1101. If the addition of the smaller balls does increase thickness over the monolayer thickness, as for the interstitial arrangement shown in view (s) of FIG. 11, a corresponding increase in voltage is required.

Another advantage of the monolayer display is improved resolution. As the display is made thinner, fringing field effects are minimized, as illustrated in FIG. 14. In each of the series of views of FIG. 14, addressing electrodes 1410 and 1411 are used to address adjacent pixels in a bichromal gyricon display. Electrode 1410 is held at a positive voltage V+ and electrode 1411 is held at a negative voltage V− with respect to a ground plane 1420. Because the applied voltages are of opposite signs, the pixels addressed by electrodes 1410 and 1411 are of opposite colors. For example, if the pixel addressed by electrode 1410 appears white, then the pixel addressed by electrode 1411 appears black. The bichromal balls are located in the space between addressing electrodes 1410, 1411 and ground plane 1420 (for clarity, only an exemplary few are shown in FIG. 14.)

In view (a), the distance h between electrodes 1410, 1411 and ground plane 1420 is relatively large. This provides a relatively large volume in which fringing fields F can develop. These are fields whose field lines curve directly from electrode 1410 to electrode 1411 instead of running to ground plane 1420. Bichromal balls 1401 and 1402 align in the preferred manner, with the white hemisphere of ball 1401 facing squarely towards electrode 1410 and the black hemisphere of ball 1402 facing squarely towards electrode 1411. However, bichromal balls 1403 and 1404 are caught in the path of fringing fields F. These balls turn at an angle to electrodes 1410 and 1411. The result is that in the region of the fringing fields F, the display appears gray instead of black or white. The width w of the fringing fields (and thus of the gray region) in view (a) is comparable to the distance h between the electrodes 1410, 1411 and ground plane 1420.

In view (b) the distance h' between electrodes 1410, 1411 and ground plane 1420 is relatively small, as for a monolayer display of the invention. This provides a relatively small volume for fringing fields F' to develop. Bichromal balls 1401 and 1402 align in the preferred manner, with the white hemisphere of ball 1401 facing squarely towards electrode 1410 and the black hemisphere of ball 1402 facing squarely towards electrode 1411. The volume of fringing fields F' is sufficiently small that very few balls are caught in the path of these fields. The result is a sharp demarcation between the black and white pixels, with very little of the gray intermediate region that was present in view (a). The width w' of the fringing fields (and thus of the gray region) in view (b) is comparable to the separation distance Δ between electrodes 1410 and 1411.

Fabrication of the Inventive Gyricon Display

The close-packed monolayer gyricon display can be fabricated by creating a monolayer of balls according to known techniques, such as that disclosed in "A Simple Method for the Production of a Two-Dimensional, Ordered Array of Small Latex Particles" by R. Micheletto, H. Fukuda, and M. Ohtsu, *Langmuir*, vol. 11, no. 9, 1995, pp. 3333–3336; preparing an elastomer sheet to contain the balls; and swelling the elastomer by application of a dielectric fluid.

Preparation of the elastomer can be carried out as for the fabrication of a conventional gyricon display, except for the way in which the elastomer is cured. With standard curing procedures, the elastomer swells over 50 percent upon application of the dielectric fluid, and the cavities in which the balls rotate are correspondingly large. Preferably, however, to achieve a close-packed layer according to the invention, the cavities should be made considerably smaller. This can be accomplished, for example, by using Dow-Corning SYLGARD 184 elastomer and curing it with a 15-percent curing agent (hardener) at 90 degrees Celsius. Upon application of ISOPAR L dielectric fluid, commonly used for known gyricon displays, the elastomer expands about 20 percent. To further control expansion, alternative dielectric fluids can be used in place of ISOPAR L. For example, for the above elastomer (15 percent cure at 90° C.), a dielectric fluid mixture of 50 percent ISOPAR L and 50 percent soybean oil yields about 10 percent expansion.

To fabricate a gyricon display having smaller balls that fill the interstices in a close-packed monolayer of larger balls, the following technique can be used: A monolayer of the larger (main) bichromal balls is prepared as described above. This monolayer is placed on a layer of sticky, partially cured elastomer. The sticky elastomer layer is of a depth such that its top surface is coplanar with, or slightly below, the plane in which the centers of the smaller (interstitial) balls are to lie. For example, if the display structure is as shown in view (e) of FIG. 11, the sticky elastomer layer will rise to a depth about halfway up the larger balls. If the display structure is as shown in view (a) of FIG. 11, the sticky layer will reach the tops of the larger balls, or just below them. Once the monolayer is in place on the sticky elastomer, the smaller (interstitial) balls are dispersed over the monolayer. The smaller balls stick to the elastomer exposed by the interstitial gaps between the larger balls. Because of the depth of the elastomer, there can be at most one small ball per gap. Preferably, all the gaps are filled by small balls. This can be accomplished by dispersing more smaller balls than are needed to fill the gaps, and allowing excess smaller balls to pile on top of the balls stuck in the gaps. The sticky elastomer is not deep enough to reach the excess piled-up balls, so the excess balls can be shaken off, leaving only the stuck interstitial balls. Additional elastomer can then be added, preferably while the sticky layer is still sticky (that is, prior to full curing), as by pouring uncured liquid elastomer over the entire assemblage to sufficient depth as to cover the tops of the main and interstitial balls. In this way, the elastomer substrate can be built up to a desired thickness.

Further Details of the Light Rectifier Model

Gyricon displays contain a large number of small particles. According to conventional wisdom, in the white state, these particles should diffusely reflect incoming light back out of the display. This desired result is similar to the reflection process in ordinary white paper and in other optical systems, such as white paint, white clouds, or milk. In other words, it is conventionally supposed that standard reflection theories, such as Kubelka-Munk theory, should apply to gyricon displays.

Accordingly, prior to the present invention, attempts to increase the reflectance of gyricon displays used techniques based on paper and other conventional diffuse reflection systems. In a sheet of paper, for example, incoming light is scattered by the small particles of fibers. Some of the light is initially reflected backward (i.e., toward the observer), but most goes forward or to the sides. The light that is not initially reflected will be scattered again by other particles, and will eventually reach either the top or bottom surface. To make the sheet perfectly white, all the light should eventually return to the top surface. Conventionally, this is achieved either by increasing the thickness of the paper or by increasing the density of scattering particles in the paper, for example, by loading with titanium dioxide.

The techniques of increasing the thickness and increasing the particle density have been tried in gyricon displays of the prior art. The results were disappointing. In particular, it was not possible to increase the brightness of the white areas of the gyricon display to the levels required for a paper surrogate.

In the research leading to the present invention, various factors that could conceivably contribute to the less-than-expected reflectance of gyricon displays were investigated, both theoretically (including computer modeling) and experimentally. It was found that a particularly significant factor is the absorptive effect of the black hemispheres of the bichromal balls: Light that passes through the interstices in the top layer of balls and is reflected from lower layers was found to be largely absorbed by the black undersurfaces of the top layer of balls. A similar effect was found to obtain for all layers in the gyricon display: In any given layer, the black undersurfaces of the bichromal balls absorb the light reflected from any lower layers.

Figure 15:
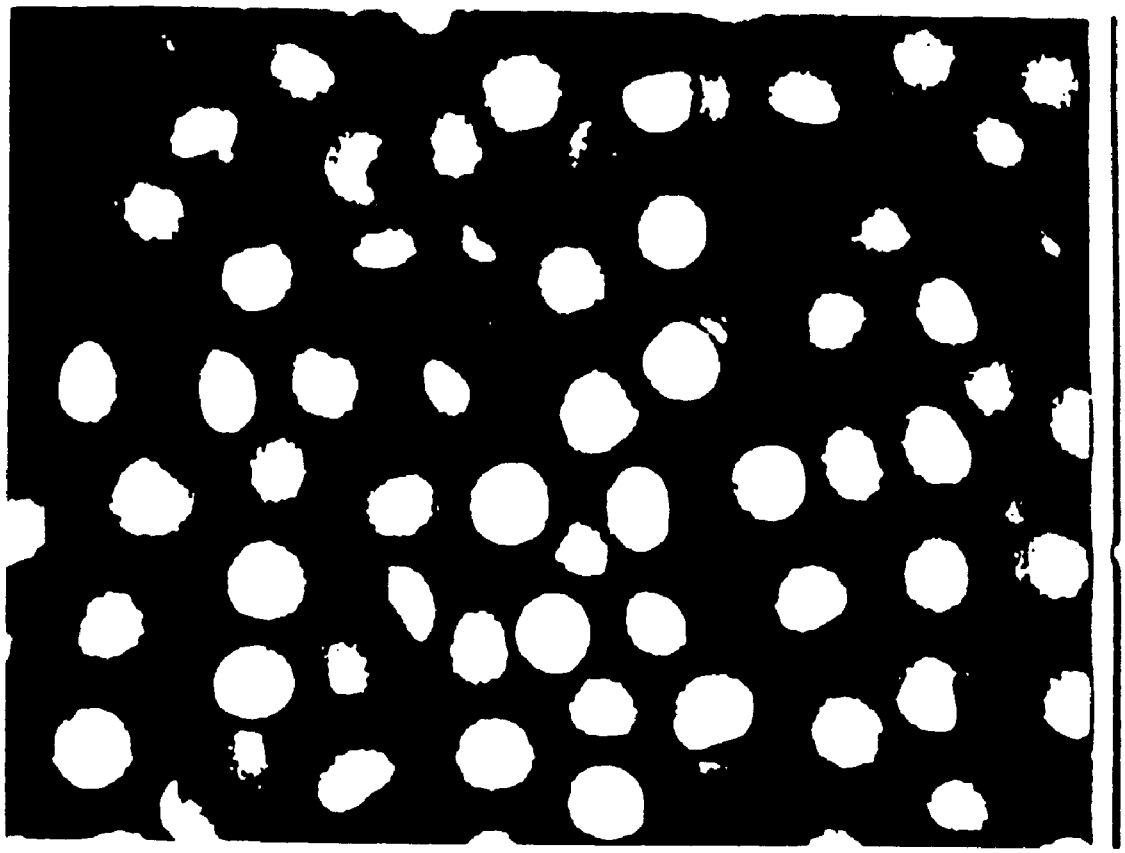
FIG. 15 is a photomicrograph of a thick gyricon display.

A photomicrograph of a thick gyricon display, taken during the course of the research, is shown in FIG. 15. As can be seen, only the balls located close to the top surface of the gyricon display appear to be white. Balls located some distance from the surface appear increasingly dark as the depth increases. (This contrasts with what is observed in conventional diffuse scattering systems, such as paper or milk. In those systems, the particles below the surface still appear white.) Adding more balls to make a thicker gyricon display does not significantly increase reflectance, because the additional balls are located farther from the viewing surface and so appear dark, looking gray rather than white.

The research showed that in a typical conventional gyricon display, bichromal balls are dispersed throughout the thickness of the substrate sheet, which is always thicker than two ball diameters and is usually many diameters thick. Generally, less than 20 percent of the upper surface area of the sheet is covered by the bichromal balls in the layer closest to the surface. This corresponds to a spacing between ball centers on the order of twice the diameter of the balls. In other words, the gaps between adjacent bichromal balls of the topmost layer are quite large, and fewer than 20 percent of the balls are situated where they can contribute effectively to display reflectance.

To provide a more accurate description of light behavior in gyricon displays, the light rectifier model was developed. This model, described above with reference to FIGS. 3 and 4, produces the following reflectance equation (1):

$$R = K\alpha \qquad \text{(Eq. 1)}$$

Here, R is the reflectance-more specifically, the diffuse reflectance-of the gyricon display, as measured by an integrating sphere technique. Integrating sphere measurement techniques are well known and are described, for example, in chapter 10 of *Reflectance Spectroscopy* by Wesley Wm. Wendlandt and Harry G. Hecht (Intersceence Publishers, 1966); diffuse reflectance (as distinct from, for example, specular or total reflectance) is defined in chapter 3 of the same reference. The diffuse reflectance of high-quality white paper is typically 85 percent and that of newsprint is typically 60 percent. The inventive gyricon displays can be expected to provide greatly improved diffuse reflectance, e.g., 30 percent, 40 percent, 60 percent, or even 80 or 85 percent, as opposed to gyricon displays of the prior art, for which the diffuse reflectance is at most 15 to 20 percent.

Further in equation (1), the areal coverage fraction a is defined as the ratio of the projected area of the white faces of the topmost bichromal balls of the gyricon display to the total area of the gyricon display viewing surface when all bichromal balls are turned with their white faces towards the viewing surface. In general, $\alpha$ depends on geometry and can be computed either globally for an entire gyricon display or locally for any region thereof.

Still further in equation (1), K is a parameter, treated here as a constant, that accounts for all sources of light loss other than the absorptive losses predicted by the light rectifier model. Such other sources of light loss can include, for example, stray black spots or streaks in the white ball hemispheres, ball surface roughness or other surface defects, bails that fail to rotate completely, mismatches between the refractive indices of the elastomer or other substrate and the working fluid in which the balls rotate, etc. Equation (1) assumes that all these other sources of light loss can be treated as independent of light rectifier losses; this assumption is valid at least as a first-order approximation.

Figure 16:
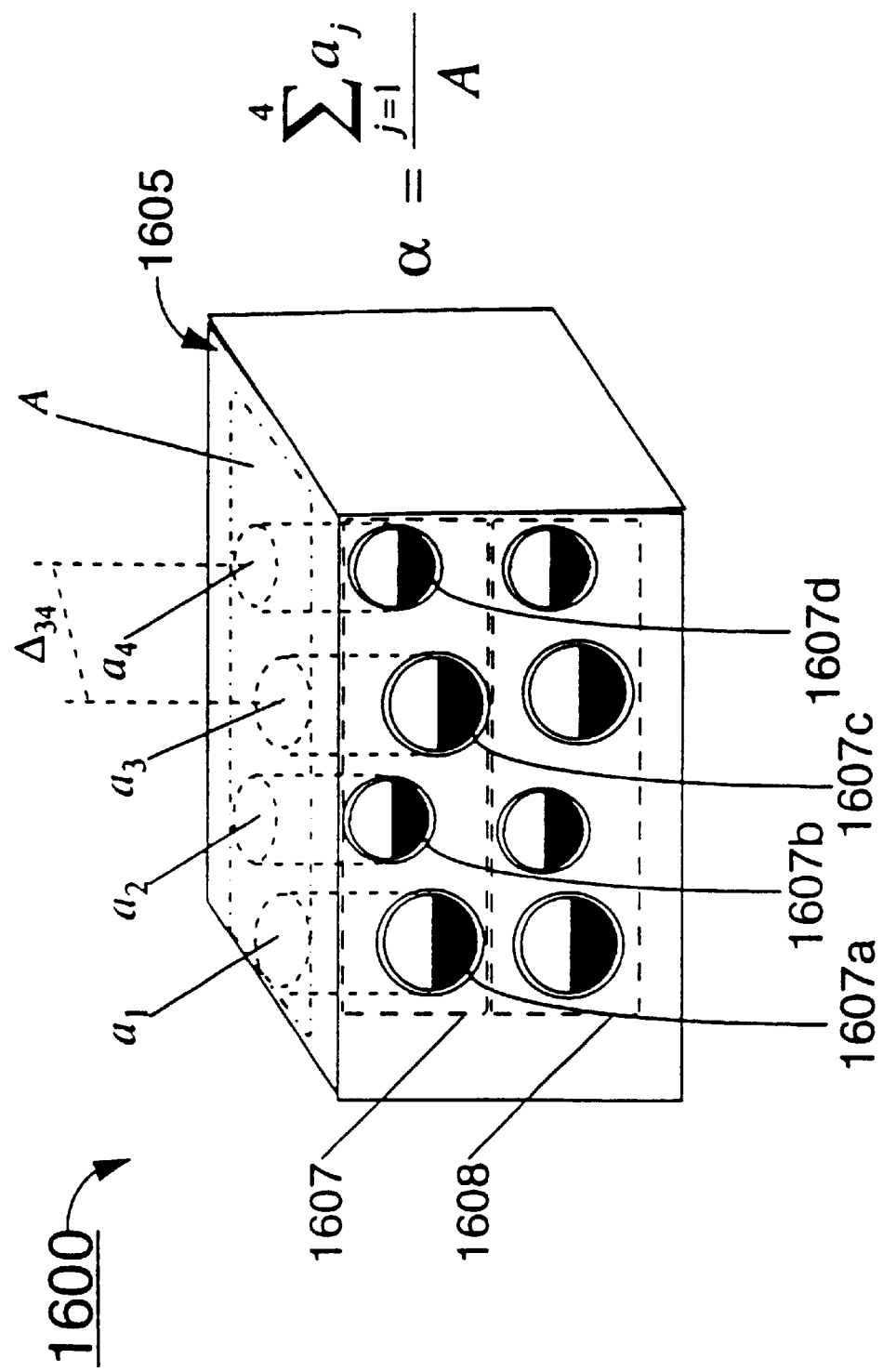

An exemplary computation of α is illustrated schematically in FIG. 16. A selected portion of gyricon display 1600 is shown. Bichromal balls of the display are turned with their white hemispheres towards viewing surface 1605. Topmost bichromal balls 1607 are those located closest to surface 1605; no other bichromal balls are situated between balls 1607 and surface 160 where they could potentially absorb light reflected by balls 1607. Bichromal balls 1608 are farther below surface 1605, so that topmost bichromal balls 1607 are between bichromal balls 1608 and surface 1605; thus the black hemispheres of topmost bichromal balls 1607 absorb most of the light reflected from bichromal balls 1608. Accordingly, only the projected areas ($\alpha_1$, $\alpha_2$, $\alpha_3$, $\alpha_4$) of the white hemispheres of topmost bichromal balls 1607 are counted toward the areal coverage fraction α, because balls 1607 are the only ones that contribute significantly to the brightness of display 1601.

Continuing in FIG. 16, α is computed by dividing the sum of the projected areas ($\alpha_1$, $\alpha_2$, $\alpha_3$, $\alpha_4$) by A, which is the area of surface 1605 for the selected portion of the display. More particularly, suppose that bichromal balls 1607a, 1607b, 1607c, 1607d have respective diameters $\delta_1, \delta_2, \delta_3, \delta_4$, so that their combined projected areas are $\alpha_1+\alpha_2+\alpha_3+\alpha_4=\pi(\delta_1^2+\delta_2^2+\delta_3^2+\delta_4^2)/4$. Also suppose that balls 1607c and 1607d are separated by a distance whose projection in the plane of surface 1605 is $\Delta_{34}$ and that the separation between balls 1607a and 1607b, and that between balls 1607b and 1607c, is also $\Delta_{34}$. Then the area A is approximately twice the area of a square of width $2\Delta_{34}$, that is, approximately $8\Delta_{34}^2$. Therefore, α is computed to be the ratio $\pi(\delta_1^2+\delta_2^2+\delta_3^2+\delta_4^2)/8\Delta_{34}^2$. Note that the other bichromal balls 1608 do not contribute to the projected areas 1610, and thus do not figure in the calculation of α.

α depends on the size of the white hemisphere of each individual ball among the topmost bichromal balls and on the amount of empty space present between the topmost bichromal balls. Thus, in general, the expression for α can be quite complicated. For example, if there are n topmost bichromal balls, and if the ith ball has diameter $\delta_i$ and the spacing between the ith and jth balls is $\Delta_{ij}$, then α is a function of all $\delta_i$ and $\Delta_{ij}$, that is, $\alpha=\alpha(\delta_i, \Delta_{ij})_{i=1,n;j=1,n}$ and $R=K\alpha(\delta_i,\Delta_{ij})_{i=1,n;j=1,n}$. Even this expression for R has certain built-in simplifying assumptions, e.g., that all topmost balls are perfectly spherical, so that the diameters $\delta_i$ are all well-defined, and that all topmost balls are located at the same distance from the surface of the gyricon display, so that $\Delta_{ij}$ need not be corrected to account for variations in ball depth (relaxation of the latter assumption leads to the formula $R=K\alpha(\delta_i, \Delta_{ij} \cos \theta_{ij})_{i=1,n; j=1,n}$, where $\theta_{ij}$ is the angle formed between the surface and a line connecting balls i and j).

If it is assumed that there are only minor variations in ball size and spacing, and that the topmost balls are in a planar layer at a fixed distance from the viewing surface, average values δ and Δ can be substituted for the individual values $\delta_i$ and $\Delta_{ij}$. Then α can be expressed as a function of the average size of the bichromal balls in the display and of the average spacing between the centers of the bichromal balls, which yields the following equation (2):

$$R=K\alpha(\delta, \Delta) \qquad \text{(Eq. 2)}$$

Here, δ is a measure of the average size of the bichromal balls. For example, δ can be the maximum or mean diameter or radius of a spheroidal ball. Δ is a measure of the average distance between ball centers, projected in the plane of the viewing surface.

For perfectly spherical balls of constant diameter d in a uniformly spaced monolayer array with characteristic spacing D, equation (2) reduces to the following equation (3):

$$R = K\frac{\alpha_0}{1+x^2} \qquad \text{(Eq. 3)}$$

Here, x is the ratio (D−d)/d, where d is the diameter of each bichromal ball and D is the characteristic center-to-center spacing between adjacent balls. Note that if the cavities in which the balls rotate are of constant diameter and are close-packed so that the walls of adjacent cavities touch one another, D is equal to the diameter of the cavities.

Further in equation (3), α is the maximum theoretically possible areal coverage fraction for the particular packing geometry of the array; that is, $\alpha_0$ is the areal coverage fraction obtained for a monolayer of spherical balls arranged in an ideal close-packed lattice of the selected geometry with surfaces of adjacent balls touching one another. $\alpha_0$ can be computed geometrically as described below with reference to FIGS. 18–20. For a hexagonal packing geometry, which is the packing geometry that most effectively covers the plane, it can be shown that $\alpha_0$ is π divided by twice the square root of 3, that is, $\pi/(2 \cdot 3^{1/2})$ or approximately 0.907; put another way, a planar close-packed hexagonal array of spheres covers approximately 0.907 times the total area of the plane. Therefore, for an ideal close-packed hexagonal monolayer array of bichromal balls and a planar viewing surface, the projected area of the ball hemispheres facing the viewing surface covers just under 91 percent of the total area of the viewing surface.

FIG. 17 illustrates the relationships among the quantities D and d of equation (3). Each of the series of views of FIG. 17 shows a portion of a gyricon display that includes bichromal balls 1701 situated in cavities 1703 beneath viewing surface 1705. The diameter of balls 1701 is d and the diameter of cavities 1703 is C. In view (a), D, the center-to-center spacing between balls 1701 is greater than C, and cavities 1703 are separated from one another by a distance of (D−C). In view (b) D', the center-to-center spacing between balls 1701 is equal to C. Cavities 1703 touch one another as shown.

FIG. 17 elucidates an important interpretation of equation (3). For an elastomer substrate in which the cavities touch, as in view (b) of FIG. 17, D=C and x=(C−d)/d, so that x+1=C/d, which is the ratio between cavity diameter and ball diameter. Thus in this case, x can be interpreted as the expansion fraction, which is the fractional increase in elastomer size (linear dimension) that takes place when dielectric fluid is applied to expand the elastomer. Accordingly, when the conditions illustrated in view (b) of FIG. 17 obtain, equation (3) can be used to estimate how display reflectance (and thus display brightness) varies with varying degrees of elastomer expansion.

According to equation (3), the display reflectance R drops rapidly as the value x=(D−d)/d increases. x increases as the center-to-center distance D) increases, that is, as the packing density of the balls decreases. In particular, in the case where D=C so that x is the expansion fraction, x increases as the degree of elastomer expansion increases. (Note that equation (3) assumes a uniform planar array of uniform-diameter bichromal balls; however, it will be appreciated that lattice defects, such as voids or dislocations in the array and nonuniform ball size, effectively increase x.)

Table 1 lists values of R computed from equation (3) for various values of x and K. A hexagonal packing geometry is assumed.

TABLE 1

| x | R (K = 1.0) | R (K = .7) | R (K = .5) |
|---|---|---|---|
| 0.000 | 0.907 | 0.635 | 0.454 |
| 0.050 | 0.823 | 0.576 | 0.411 |
| 0.100 | 0.750 | 0.525 | 0.375 |
| 0.150 | 0.686 | 0.480 | 0.343 |
| 0.200 | 0.630 | 0.441 | 0.315 |
| 0.250 | 0.580 | 0.406 | 0.290 |
| 0.300 | 0.537 | 0.376 | 0.268 |
| 0.350 | 0.498 | 0.348 | 0.249 |
| 0.400 | 0.463 | 0.324 | 0.231 |
| 0.450 | 0.431 | 0.302 | 0.216 |
| 0.500 | 0.403 | 0.282 | 0.202 |
| 0.600 | 0.354 | 0.248 | 0.177 |
| 0.700 | 0.314 | 0.220 | 0.157 |
| 0.800 | 0.280 | 0.196 | 0.140 |
| 0.900 | 0.251 | 0.176 | 0.126 |
| 1.000 | 0.227 | 0.159 | 0.113 |

As can be seen from Table 1 the reflectance R decreases rapidly as x increases. For example, for K=1 (that is, no losses other than light rectifier losses), with x=0.35, over half the incident light is lost. For the more realistic value K=0.7, which was determined experimentally during the research as an approximate value for some of the gyricon displays studied, even with x=0.15, over half the incident light is lost, and with x=0.35, nearly two-thirds of the incident light is lost. For a lower quality display having K=0.5, with x=0.15, almost two-thirds of the incident light is lost, and with x=0.35, over three-fourths of the incident light is lost.

Reflectance R is maximized when x is minimized. By rewriting x=(D−d)/d as D/d=x+1, it can be seen that x is minimized when D/d, the ratio between the center-to-center spacing D and the ball diameter d, is minimized. The smallest value possible for D/d is obtained when x=0, so that D/d=1. This corresponds to an ideal close-packed layer according to the invention, in which the center-to-center spacing D is equal to the ball diameter d so that the ball surfaces touch one another.

To summarize briefly, the areal coverage fraction α, and thus the reflectance R, is maximized for a gyricon display of the invention by packing the bichromal balls of the monolayer (or top layer) as close together as possible, that is, in a hexagonal close-packed planar array with the cavity diameter C equal to the ball diameter d and the cavities touching so that D=C. In this ideal case, x=0 and the projected area of the monolayer covers just under 91 percent of the viewing surface. Still greater areal coverage and reflectance can be achieved by situating smaller balls within the interstices of the hexagonal packing arrangement, as was described above with reference to FIGS. 11–13.

Figure 18:
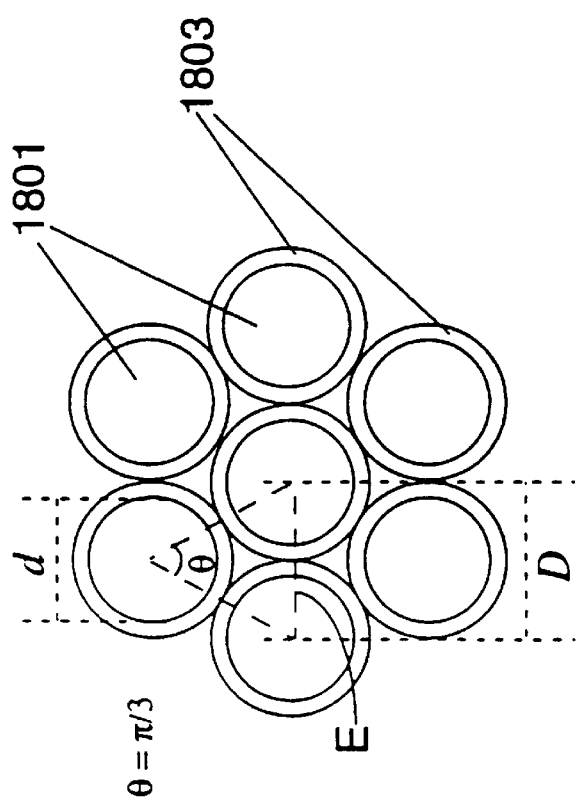
FIGS. 18–20 illustrates the calculation of the areal coverage fraction $\alpha$ in, respectively, hexagonally, rectangularly, and rhomboidally (diamond) packed monolayer geometries of uniform bichromal spheres.
Figure 20:
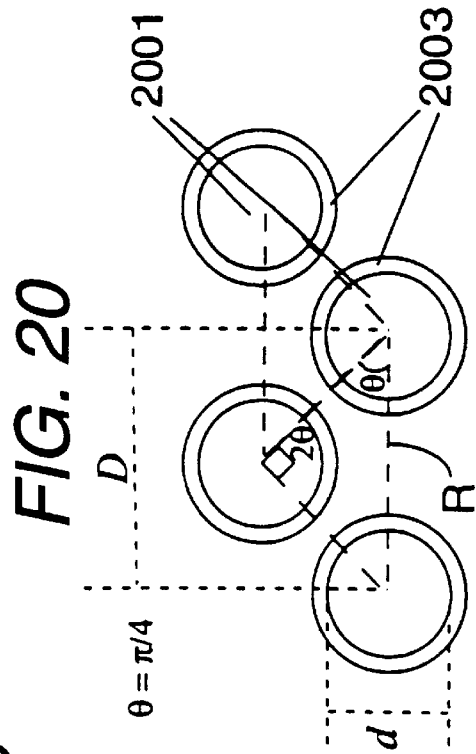
Figure 19:
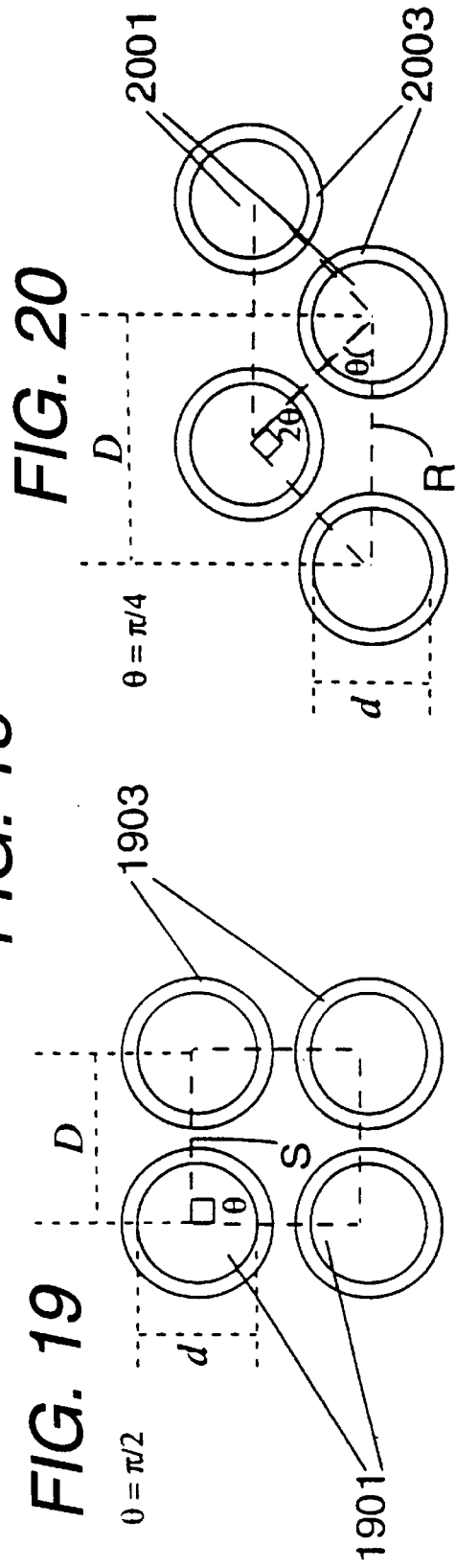

FIGS. 18–20 illustrate the computation of the areal coverage fraction a and maximum areal coverage fraction $\alpha_0$ for planar monolayers of uniform diameter spherical balls in various packing geometries. In FIG. 18, a hexagonal array of balls 1801 situated in cavities 1803 is shown in a top view. Balls 1801 have diameter d and center-to-center spacing D (equal to the cavity diameter, since cavities 1803 touch one another). The centers of neighboring balls form an equilateral triangle E. The areal coverage fraction is computed as the ratio between the area of that portion of the triangle E overlapped by projected areas of balls 1801 and the area of the entire triangle E. The projected area for each of balls 1801 is $\pi d^2/4$. Therefore, the area of the region of overlap for each ball in the vicinity of triangle E is $\theta \cdot d^2/8$ where $\theta$ is expressed in radians as $\theta=\pi/3$. Three balls are in the vicinity of triangle E. Triangle E has a base of length D. Thus $\alpha=3(\pi d^2/24) \div (3^{1/2}/4)D^2=\pi^2/(2 \cdot 3^{1/2})D^2$. The maximum areal coverage fraction $\alpha_0$, achieved when D=d is $\pi(2 \cdot 3^{1/2})$ or approximately 0.907.

In FIG. 19, a rectangular array of balls 1901 situated in cavities 1903 is shown in a top view. Balls 1901 have diameter d and center-to-center spacing D. The centers of neighboring balls form a square S. The areal coverage fraction is computed as the ratio between the area of that portion of the square S overlapped by projected areas of balls 1901 and the area of the entire square S. The projected area for each of balls 1901 is $\pi d^2/4$. The area of the region of overlap for each ball in the vicinity of square S is $\theta \cdot d^2/8$ where $\theta$ is expressed in radians as $\theta=\pi/2$. Four balls are in the vicinity of square S. Square S has a base of length D. Thus $\alpha=4(\pi d^2/16) \div D^2=\pi d^2/4D^2$. The maximum areal coverage fraction $\alpha_0$, achieved when D=d, is $\pi/4$, or approximately 0.785.

In FIG. 20, a rhomboidal array of balls 2001 situated in cavities 2003 is shown in a top view. Balls 2001 have diameter d and center-to-center spacing D. The centers of neighboring balls form a rhombus R. The areal coverage fraction is computed as the ratio between the area of that portion of the rhombus R overlapped by projected areas of balls 1901 and the area of the entire rhombus. R. Going through the calculations once again, the results are $\alpha=\pi d^2/4D^2$ and $\alpha_0=\pi/4$, the same results as for the rectangular packing geometry.

Monolayer Gyricon Display with No Cavities

In a gyricon display made with swelled elastomer, each bichromal ball is situated in a cavity. As discussed above, to achieve the closest possible packing of bichromal balls in such a display, the cavities are preferably made as small and as close together as possible.

To achieve still higher packing density, a gyricon display can be constructed without elastomer and without cavities. In such a display, the bichromal balls are placed directly in the dielectric fluid. The balls and the dielectric fluid are then sandwiched between two retaining members (e.g., between the addressing electrodes). There is no elastomer substrate.

Figure 21:
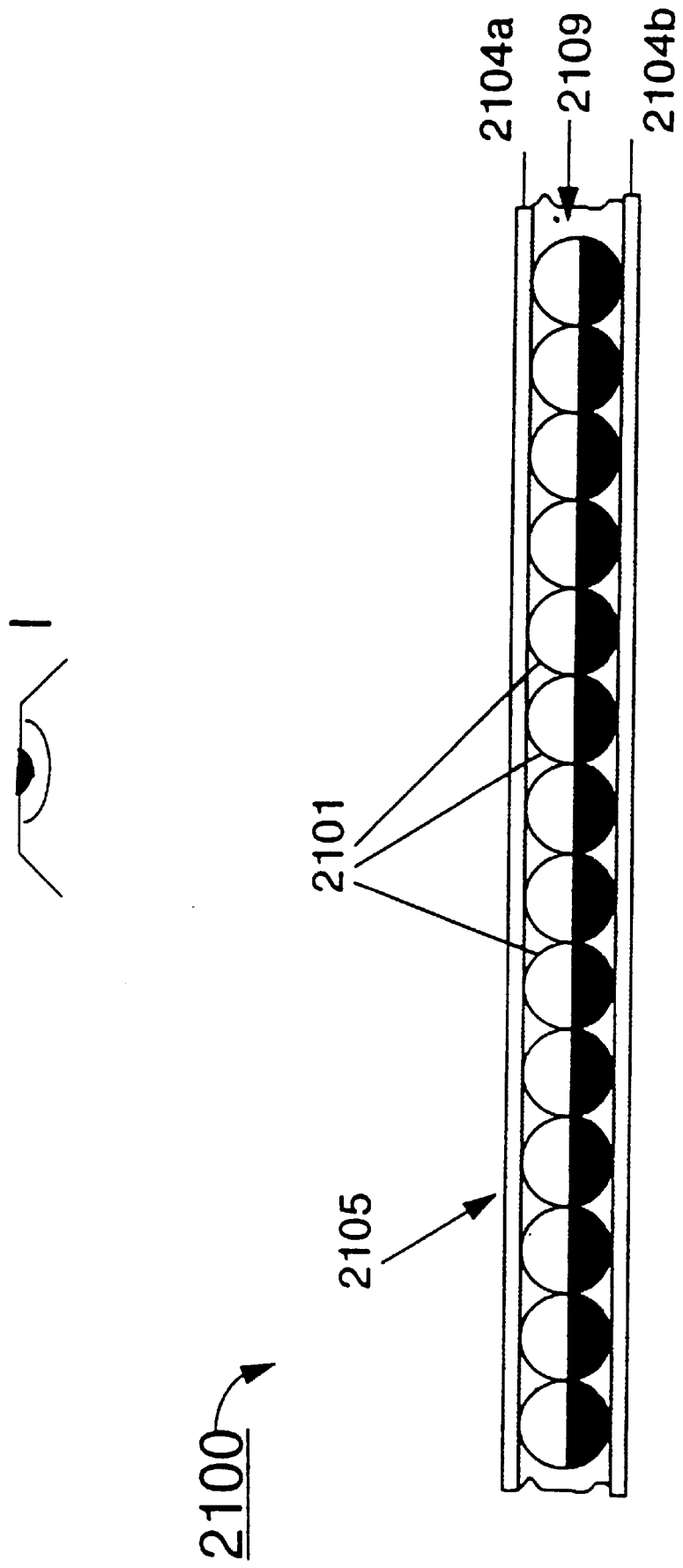
FIG. 21 illustrates an alternative embodiment of the invention in which a close-packed monolayer of gyricon balls is placed in a fluid directly between transparent electrodes, without an elastomer or other cavity-containing substrate medium.

FIG. 21 illustrates a side view of a no-cavities gyricon display. In display 2100, a monolayer of bichromal balls 2101 of uniform diameter is situated in dielectric fluid 2109 between matrix-addressable electrodes 2104a, 2104b. Preferably balls 2101 are arranged in a hexagonal array within the monolayer, packed as close together as is possible consistent with proper ball rotation. Balls 2101 are electrically dipolar in the presence of dielectric fluid 2109 and so are subject to rotation upon application of an electric field, as by electrodes 2104a, 2104b. The electrode 2104a closest to upper surface 2105 is preferably transparent. An observer at I sees an image formed by the black and white pattern of the balls 2101 as rotated to expose their black or white hemispheres to the upper surface 2105 of display 2100.

Electrodes 2104a, 2104b serve both to address balls 2101 and to retain balls 2101 and fluid 2109 in place. Preferably the spacing between electrodes 2104a, 2104b is as close to the diameter of balls 2101 as is possible consistent with proper ball rotation. Balls 2101 and fluid 2109, can be sealed in display 2100, for example by seals at either end of the display (not shown).

The packing density of the bichromal balls 2101 in display 2100 can closely approach the ideal case wherein x=0 in equation (3). Thus display 2100 provides maximum reflectance and maximum brightness.

The close packing of balls 2101 in the monolayer, together with the close spacing of the electrodes 2104a, 2104b, ensures that balls 2101 do not settle, migrate, or otherwise escape from their respective positions in the monolayer. Interstitial balls (not shown) can also be included in display 2100, for example by using the arrangement and interstitial ball diameter shown in views (c) and (d) of FIG. 11. The smaller balls are retained in place from above by upper electrode 2104a and from below by the larger balls 2101.

Conclusion

Gyricon displays have unique optical properties. Conventional approaches used to increase the reflectance of diffuse scattering arrays do not work well for gyricon displays. Conventional optical models, which assume that the bichromal balls situated well below the viewing surface of a gyricon display contribute as much to overall display brightness as do the bichromal balls nearest the viewing surface, do not accurately describe gyricon display optics. The light rectifier model provides a better description.

The invention provides a new gyricon display based on a close-packed monolayer of bichromal balls. The design of the new display takes the light rectifier model into account, in that the light reflected from the display is reflected almost entirely from the upper hemispheres of balls in the close-packed monolayer. The inventive display provides superior reflectance and brightness characteristics as compared with conventional gyricon displays, and accordingly it provides superior contrast characteristics as well. Moreover, because of the monolayer construction, the new display requires lower voltage than conventional gyricon displays, and can provide superior resolution inasmuch as electric field fringing effects are minimized. It is hoped that the new gyricon display of the invention will go a long way toward making the promise of electric paper come true.

The foregoing specific embodiments represent just some of the possibilities for practicing the present invention. Many other embodiments are possible within the spirit of the invention. For example:

The electrical anisotropy of a gyricon ball need not be based on zeta potential. It is sufficient that there is an electrical dipole moment associated with the ball, the dipole moment being aligned with respect to the ball in such a way as to facilitate a useful rotation of the ball in the presence of an applied external electric field. (Typically, the dipole moment is oriented along an axis of symmetry of the ball.) Further, it should be noted that a gyricon ball can have an electrical monopole moment in addition to its electrical dipole moment, as for example when the dipole moment arises from a separation of two positive charges of different magnitudes, the resulting charge distribution being equivalent to a positive electrical monopole superposed with a electrical dipole.

The optical anisotropy of a gyricon ball need not be based on black and white. For example, bichromal balls having hemispheres of two different colors, e.g. red and blue, can be used. As another example, balls that are black in one hemisphere and mirrored in the other might be used for some applications. In general, various optical properties can vary as different aspects of a gyricon ball are presented to an observer, including (but not limited to) light scattering and light reflection in one or more regions of the spectrum. Thus the gyricon balls can be used to modulate light in a wide variety of ways.

The incident light that encounters a gyricon display need not be restricted to visible light. Given suitable materials for the gyricon balls, the incident "light" can be, for example, infrared light or ultraviolet light, and such light can be modulated by the gyricon display.

On several occasions the foregoing description refers to a planar monolayer of bichromal balls. However, persons of skill in the art will appreciate that a gyricon display (or a sheet of bichromal balls for use in such a display) made of a flexible material can be temporarily or permanently deformed (for example, flexed, folded, or rolled) so as not to be strictly planar overall. In such cases, the plane of a monolayer can be defined, for example, in a locally planar neighborhood that includes the gyricon ball or balls of interest. Also, it will further be appreciated that in practice the monolayer can vary somewhat from what has been described, for example, due to manufacturing tolerances or slight imperfections of particular gyricon sheets.

The inventive display can also be built using cylindrical elements in place of the usual spherical elements l(e.g., bichromal cylinders instead of bichromal balls), as disclosed in copending, coassigned application Ser. No. 08/716,672, entitled "Twisting-Cylinder Display."

Accordingly, the scope of the invention is not limited to the foregoing specification, but instead is given by the appended claims together with their full range of equivalents.

I claim:

1. A material comprising:

a substrate; and a plurality of optically anisotropic particles disposed in the substrate, the plurality of particles including first and second populations of particles, the particles of the first population as considered by themselves without the particles of the second population being disposed in the substrate in a closely packed arrangement having interstices, the particles of the second population being disposed in the interstices of the arrangement, a rotatable disposition of each particle of the plurality being achievable while said particle is thus disposed in the substrate, said particle, when in said rotatable disposition, not being attached to the substrate.

2. The material of claim 1 wherein the arrangement of particles of the first population is a substantially geometrically regular arrangement.

3. The material of claim 1 wherein the arrangement of particles of the first population is a monolayer.

4. The material of claim 3 wherein:

the particles of the first population are of a substantially uniform size characterized by a first linear dimension $\alpha$;

each particle of the first population has a center point;

each pair of nearest neighboring particles of the first population in the arrangement is characterized by an average distance D therebetween, said distance D being measured between particle center points; and the particles are sufficiently closely packed in the arrangement that the ratio D/d is less than 1.2.

5. The material of claim 4 wherein the ratio D/d is made as close to 1.0 as practicable.

6. The material of claim 3 wherein the particles of the first population are sufficiently closely packed in the arrangement that each particle of the first population comes as close as possible to touching said particle's nearest neighboring particles of the first population.

7. The material of claim 1 wherein the arrangement of particles of the first population comprises substantially a single layer of particles.

8. The material of claim 7 wherein the substrate has a surface and the layer of particles of the first population is substantially parallel to the surface.

9. The material of claim 7 wherein:

the substrate has a surface, the surface having an area;

the layer of particles of the first population is formed of those particles situated closest to the substrate surface among all the particles of the first population, each particle in the layer having a center point, substantially no particle in the layer being disposed entirely behind the center point of any nearest neighboring particle in the layer with respect to the substrate surface; and each particle in the layer has a projected area with respect to the substrate surface, the particles of the layer being sufficiently closely packed with respect to one another in the layer that the union of their projected areas exceeds two-thirds of the area of the substrate surface.

10. The material of claim 7 wherein:

the substrate has a surface;

the layer of particles of the first population (hereinafter, "the first layer") is disposed substantially parallel to the substrate surface and is formed of those particles situated closest to the substrate surface among all the particles of the first population, each particle in the first layer having a center point, substantially no particle in the first layer being disposed entirely behind the center point of any nearest neighboring particle in the first layer with respect to the substrate surface; and the interstitially disposed particles of the second population include a set of particles which, as considered by themselves without the particles of the first population, form an additional layer (hereinafter, "the second layer"), each particle in the second layer having a center point, the center point of substantially every particle in the second layer being situated between the substrate surface and an imaginary surface constructed from the center points of the particles in the first layer.

11. The material of claim 10 wherein:

the substrate surface has an area;

the particles of the first layer are arrayed in a packing geometry;

each particle in each of the first and second layers has a projected area with respect to the substrate surface; and the particles of the first layer are sufficiently closely packed with respect to one another in the first layer and the particles of the second layer are sufficiently numerous and disposed in the interstices of the first layer such that the ratio of the union of the projected areas of the particles in the first and second layers to the area of the substrate surface exceeds $\alpha_0$, where $\alpha_0$ is the maximum theoretically possible areal coverage fraction for the packing geometry of the first layer, $\alpha_0$ being approximately equal to 90.7 percent for a maximally close-packed hexagonal packing geometry.

12. The material of claim 1 wherein:

the particles of the first population are of a substantially uniform first size characterized by a first linear dimension; and the particles of the second population are of a substantially uniform second size characterized by a second linear dimension less than the first linear dimension.

13. The material of claim 12 wherein:

the particles of the first population are spheroidal balls characterized by a first average diameter, the first linear dimension being the first average diameter; and the particles of the second population are spheroidal balls characterized by a second average diameter, the second linear dimension being the second average diameter.

14. The material of claim 1 wherein the arrangement of particles of the first population is a hexagonally packed array.

15. The material of claim 1 wherein the arrangement of particles of the first population is a quadrilaterally packed array.

16. The material of claim 1 wherein the particles of the first and second populations are rotatable in the substrate.

17. The material of claim 1 wherein the substrate comprises an elastomer that can be expanded by application of a fluid thereto so as to render the particles of the first and second populations rotatable therein.

18. The material of claim 1 wherein the particles of the first and second populations have similar optical anisotropies.

19. The material of claim 1 wherein each particle of the plurality of particles has a plurality of component regions giving rise to the particle's optical anisotropy, each region having an optical modulation characteristic, the regions including a first optically reflective component region and a second optically absorptive component region.

20. The material of claim 1 wherein each particle of the plurality has an anisotropy for providing an electrical dipole moment, the electrical dipole moment rendering the particle electrically responsive such that when the particle is rotatably disposed in an electric field while the electrical dipole moment is provided, the particle tends to rotate to an orientation in which the electrical dipole moment aligns with the electric field.

21. Apparatus comprising:

a piece of the material recited in claim 20; and means for producing an electric field to facilitate a rotation of at least one particle rotatably disposed in the substrate of the piece of material.

22. Apparatus comprising:

a piece of the material recited in claim 1; and means for facilitating a rotation of at least one particle rotatably disposed in the substrate of the piece of material.

23. Apparatus comprising:

a member having an optically transmissive viewing surface;

a plurality of optically anisotropic particles rotatably disposed behind the viewing surface with respect to an observer situated favorably to observe the viewing surface, at least some of the particles thus being observable by the observer through the viewing surface, each particle of the plurality having an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field, the plurality of particles including first and second populations of particles, the particles of the first population as considered by themselves without the particles of the second population being disposed in an arrangement having interstices, the particles of the second population being disposed in the interstices of the arrangement;

means for keeping in place with respect to the viewing surface the particles of the plurality thus disposed; and means for facilitating a rotation of at least one of the particles of the plurality thus disposed by selectively applying an electric field to a particle for which the electrical dipole moment is provided.

24. The apparatus of claim 23 wherein the means for keeping the particles of the plurality in place comprises a substrate in which the particles of the plurality are rotatably disposed.

25. The apparatus of claim 23 wherein:

the arrangement of particles of the first population comprises substantially a single layer of particles, the single layer being substantially parallel to the viewing surface; and the means for keeping the particles of the plurality in place comprises an additional member having a surface substantially parallel to the viewing surface, the additional member being disposed behind the layer of particles of the first population with respect to said observer so that the particles in the layer are thus situated between the viewing surface and the surface of the additional member.

26. A material comprising:

a substrate; and a plurality of optically anisotropic particles disposed in the substrate, the plurality of particles including first and second populations of particles, the particles of the first population being of a substantially uniform first size characterized by a first linear dimension, the particles of the second population being of a substantially uniform second size characterized by a second linear dimension less than the first linear dimension, the particles of the first and second populations having similar optical anisotropies, a rotatable disposition of each particle of the plurality being achievable while said particle is thus disposed in the substrate, said particle, when in said rotatable disposition, not being attached to the substrate.

27. A material comprising:

a substrate having an optically transmissive surface, the surface having an area; and a plurality of optically anisotropic particles disposed in the substrate, the plurality of particles including first and second populations of particles, the particles of the first population as considered by themselves without the particles of the second population being disposed in the substrate in an arrangement comprising substantially a single layer of particles, the layer being formed of those particles situated closest to the substrate surface among all the particles of the first population, each particle in the layer having a center point, substantially no particle in the layer being disposed entirely behind the center point of any nearest neighboring particle in the layer with respect to the substrate surface, each particle in the layer having a projected area with respect to the substrate surface, the particles of the layer being sufficiently closely packed with respect to one another in the layer that the union of their projected areas exceeds two-thirds of the area of the substrate surface, the particles of the second population being situated amidst the particles of the first population such that light incident on a portion of the substrate and transmitted therethrough towards the particles of the plurality in a vicinity of said portion illuminates and is modulated by particles of both populations in said vicinity, the particles of the second population in said vicinity thus modulating light that would otherwise, but for the presence of the particles of the second population, pass through the layer by passing between particles of the first population.

* * * * *

UNITED STATES PATENT AND TRADEMARK OFFICE
CERTIFICATE OF CORRECTION

PATENT NO. : 5,914,805

DATED : June 22, 1999

INVENTOR(S) : Joseph M. Crowley

It is certified that error appears in the above-identified patent and that said Letters Patent is hereby corrected as shown below:

Column 5, line 41, after "a"(first occurrence) insert --a scanned image of--.

Column 16, line 7, after "A" insert --scanned image of a--.

Signed and Sealed this

Second Day of November, 1999

Attest:

Attesting Officer

Q. TODD DICKINSON

Acting Commissioner of Patents and Trademarks